United States Patent
Matsuno et al.

(10) Patent No.: US 11,990,603 B2
(45) Date of Patent: May 21, 2024

(54) NEGATIVE ELECTRODE MATERIAL, METHOD OF PRODUCING THE NEGATIVE ELECTRODE MATERIAL, AND MIXED NEGATIVE ELECTRODE MATERIAL

(71) Applicant: SHIN-ETSU CHEMICAL CO., LTD., Tokyo (JP)

(72) Inventors: Takumi Matsuno, Annaka (JP); Takakazu Hirose, Annaka (JP); Kohta Takahashi, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/477,686

(22) PCT Filed: Feb. 26, 2018

(86) PCT No.: PCT/JP2018/006849
§ 371 (c)(1),
(2) Date: Jul. 12, 2019

(87) PCT Pub. No.: WO2018/168411
PCT Pub. Date: Sep. 20, 2018

(65) Prior Publication Data
US 2019/0341602 A1     Nov. 7, 2019

(30) Foreign Application Priority Data

Mar. 13, 2017   (JP) .................................. 2017-047841

(51) Int. Cl.
*H01M 4/36* (2006.01)
*H01M 4/02* (2006.01)
(Continued)

(52) U.S. Cl.
CPC ............ *H01M 4/134* (2013.01); *H01M 4/131* (2013.01); *H01M 4/133* (2013.01); *H01M 4/364* (2013.01);
(Continued)

(58) Field of Classification Search
CPC ...... H01M 4/134; H01M 4/131; H01M 4/133; H01M 4/364; H01M 4/525;
(Continued)

(56) References Cited

U.S. PATENT DOCUMENTS 5,395,711 A     3/1995 Tahara et al.
8,673,490 B2 *  3/2014 Kumar ................. H01M 4/386
                                              429/206
(Continued)

FOREIGN PATENT DOCUMENTS

CN     105474438 A    4/2016
JP     2997741 B2     1/2000
(Continued)

OTHER PUBLICATIONS

Bercovich et al., Preparation of Amorphous Aluminum Oxide-Hydroxide Nanoparticles in Amphiphilic Silicon-Based Copolymer Microemulsions, Journal of Colloid and Interface Science, 245, 58-67, 2002. (Year: 2001).*
(Continued)

*Primary Examiner* — Christian Roldan
(74) *Attorney, Agent, or Firm* — Oliff PLC

(57) ABSTRACT

A negative electrode material containing a negative electrode active material particle which includes a silicon compound particle containing a silicon compound ($SiO_x$: $0.5 \leq x \leq 1.6$). The silicon compound particle contains at least one or more of $Li_2SiO_3$ and $Li_4SiO_4$, and the negative electrode material further contains at least one of a metal compound particle containing a metal compound and an
(Continued)

aggregate of the metal compound particle. The negative electrode material is capable of stabilizing a slurry prepared in production of a negative electrode for a secondary battery, and improving initial charge-discharge characteristics and cycle characteristics when it is used as a negative electrode active material for a secondary battery.

17 Claims, 3 Drawing Sheets

(51) Int. Cl.
| | |
|---|---|
| H01M 4/131 | (2010.01) |
| H01M 4/133 | (2010.01) |
| H01M 4/134 | (2010.01) |
| H01M 4/38 | (2006.01) |
| H01M 4/525 | (2010.01) |
| H01M 10/0525 | (2010.01) |

(52) U.S. Cl.
CPC ........ *H01M 4/525* (2013.01); *H01M 10/0525* (2013.01); *H01M 2004/027* (2013.01)

(58) Field of Classification Search
CPC ........ H01M 10/0525; H01M 2004/027; H01M 4/386; H01M 4/362; H01M 4/625; Y02E 60/10; C01B 33/113
USPC .............................................. 429/231
See application file for complete search history.

(56) References Cited

U.S. PATENT DOCUMENTS

| | | | | |
|---|---|---|---|---|
| 10,418,627 | B2* | 9/2019 | Hirose | H01M 4/133 |
| 2006/0083987 | A1 | 4/2006 | Konishiike et al. | |
| 2006/0099507 | A1 | 5/2006 | Kogetsu et al. | |
| 2007/0190413 | A1 | 8/2007 | Lee et al. | |
| 2008/0176137 | A1 | 7/2008 | Endo et al. | |
| 2009/0075173 | A1* | 3/2009 | Jeong | H01M 4/364 |
| | | | | 429/231.95 |
| 2009/0111020 | A1* | 4/2009 | Yamaguchi | H01M 10/0569 |
| | | | | 429/207 |
| 2009/0202911 | A1 | 8/2009 | Fukuoka et al. | |
| 2009/0311598 | A1* | 12/2009 | Tadano | H01M 4/139 |
| | | | | 429/215 |
| 2011/0175020 | A1 | 7/2011 | Lee et al. | |
| 2011/0244333 | A1 | 10/2011 | Kawada | |
| 2014/0205907 | A1* | 7/2014 | Kang | H01M 4/48 |
| | | | | 429/231.3 |
| 2015/0221950 | A1* | 8/2015 | Minami | H01M 10/0525 |
| | | | | 429/223 |
| 2015/0321166 | A1* | 11/2015 | Kim | B01J 20/3483 |
| | | | | 502/411 |
| 2016/0190553 | A1 | 6/2016 | Minami et al. | |
| 2016/0211519 | A1* | 7/2016 | Uchiyama | H01M 4/0404 |
| 2016/0233484 | A1 | 8/2016 | Hirose et al. | |
| 2016/0254537 | A1 | 9/2016 | Kamo et al. | |
| 2016/0344019 | A1 | 11/2016 | Hirose et al. | |
| 2018/0175377 | A1 | 6/2018 | Hirose et al. | |

FOREIGN PATENT DOCUMENTS

| | | | |
|---|---|---|---|
| JP | 2001-185127 | A | 7/2001 |
| JP | 2002-042806 | A | 2/2002 |
| JP | 2006-114454 | A | 4/2006 |
| JP | 2006-164954 | A | 6/2006 |
| JP | 2007-500421 | A | 1/2007 |
| JP | 2007-234255 | A | 9/2007 |
| JP | 2008-177346 | A | 7/2008 |
| JP | 2008-251369 | A | 10/2008 |
| JP | 2008-282819 | A | 11/2008 |
| JP | 2009-070825 | A | 4/2009 |
| JP | 2009-205950 | A | 9/2009 |
| JP | 2009-212074 | A | 9/2009 |
| JP | 2013-197012 | A | 9/2013 |
| JP | 2015-149221 | A | 8/2015 |
| JP | 201635940 | * | 12/2015 |
| JP | 2016-164870 | A | 9/2016 |
| JP | 2017-010645 | A | 1/2017 |
| JP | 2017-091978 | A | 5/2017 |
| JP | 2017-152358 | A | 8/2017 |
| WO | 2015/045316 | A1 | 4/2015 |
| WO | 2016/185663 | A1 | 11/2016 |
| WO | 2016/203696 | A1 | 12/2016 |

OTHER PUBLICATIONS

May 29, 2018 Search Report issued in International Patent Application No. PCT/JP2018/006849.

Nov. 20, 2020 Extended European Search Report issued in European Patent Application No. 18767113.6.

Apr. 13, 2022 Search Report issued in Chinese Patent Application No. 201880017583.5.

Jingbo, Chen, et al. "Si-Based Composite Anode Materials for Lithium Ion Batteries." Progress in Chemistry, vol. 21, No. 10, Oct. 2009, pp. 125-132.

Nov. 26, 2021 Office Action issued in Chinese Patent Application No. 201880017583.5.

Oct. 14, 2022 Office Action issued in Korean Patent Application No. 10-2019-7026454.

* cited by examiner

[FIG. 1]
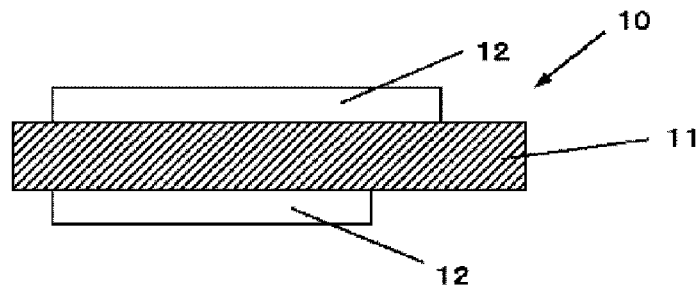
[FIG. 2]
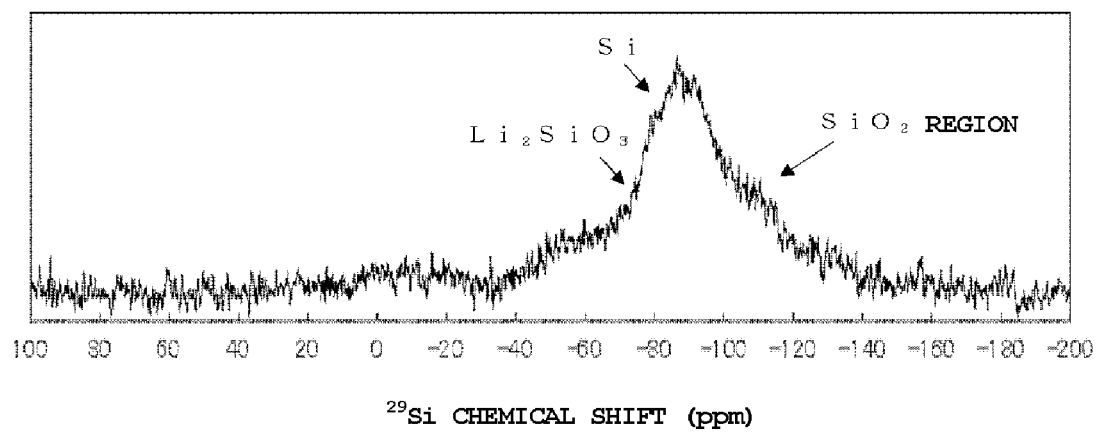
[FIG. 3]
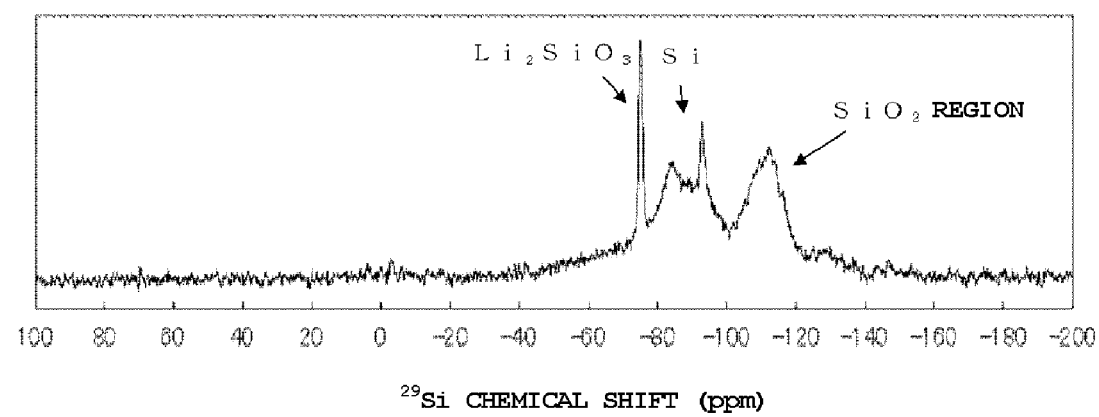

[FIG. 4]
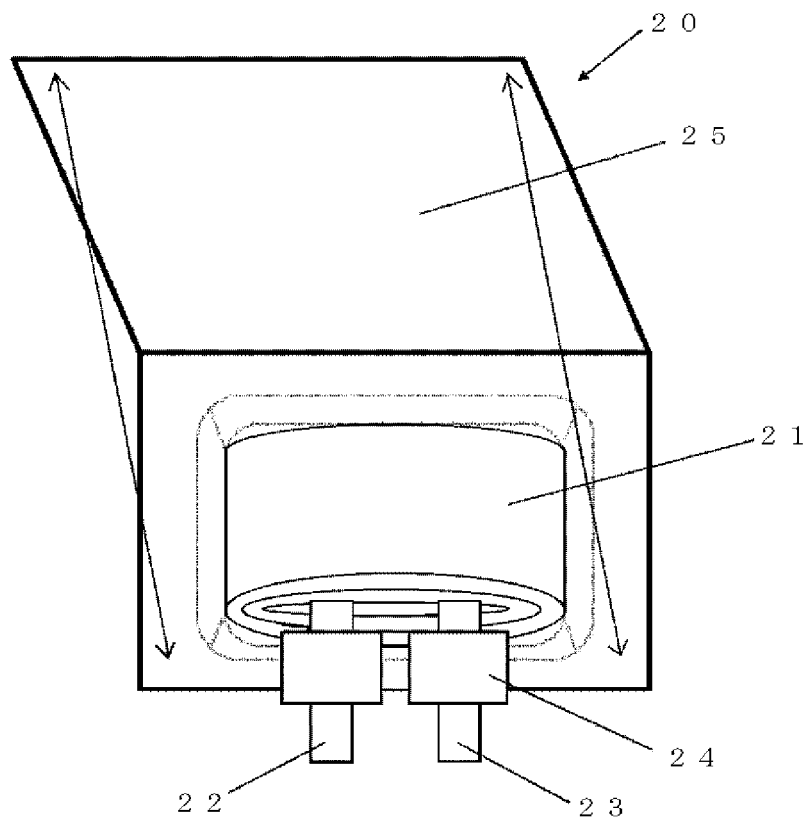
[FIG. 5]
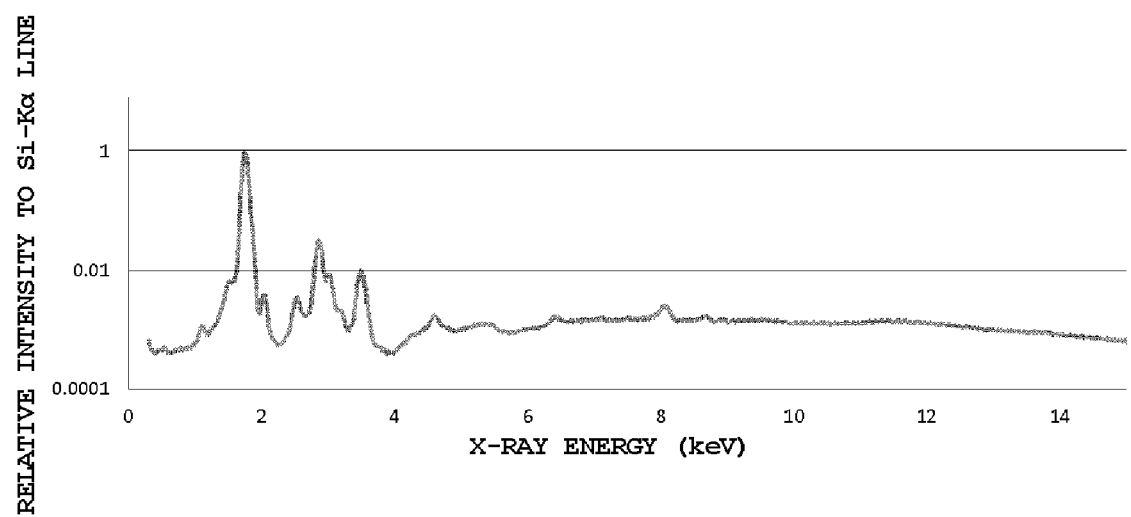

[FIG. 6]
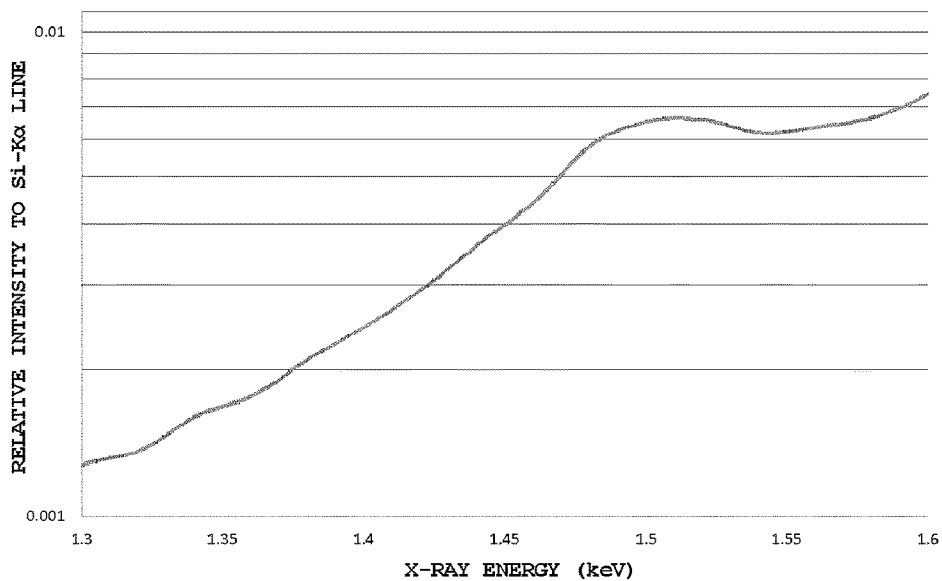
[FIG. 7]
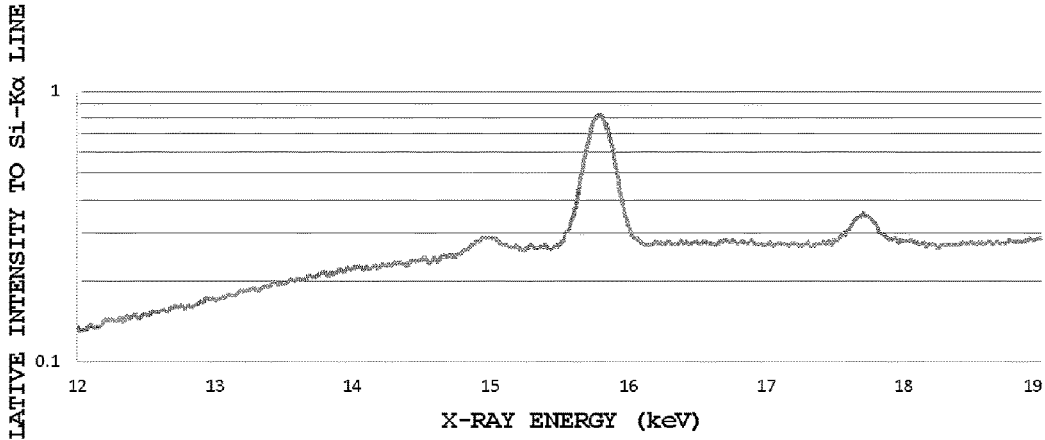
[FIG. 8]
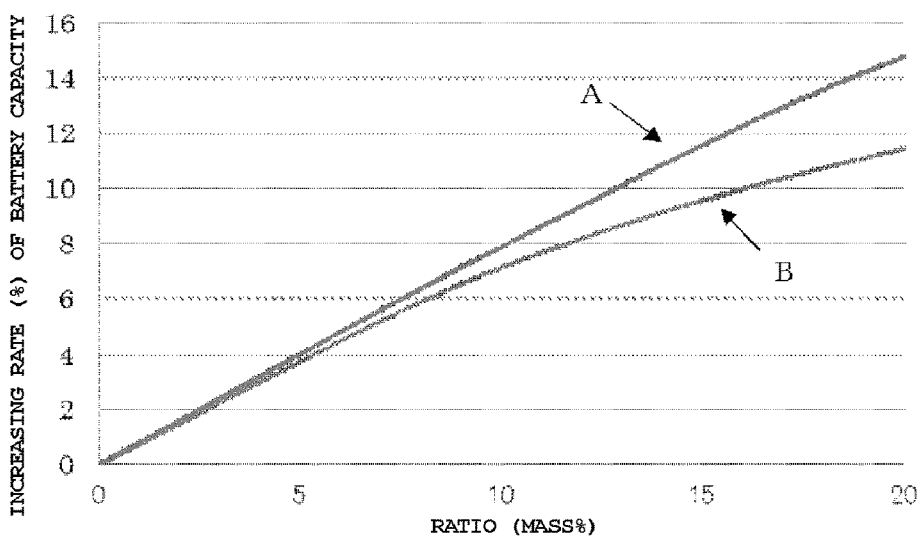

NEGATIVE ELECTRODE MATERIAL, METHOD OF PRODUCING THE NEGATIVE ELECTRODE MATERIAL, AND MIXED NEGATIVE ELECTRODE MATERIAL

TECHNICAL FIELD

The present invention relates to a negative electrode material, a method of producing the negative electrode material, and a mixed negative electrode material.

BACKGROUND ART

In recent years, small electronic devices, represented by mobile terminals, have been widely used and urgently required to reduce the size and weight and to increase the life. Such market requirements have advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

More specifically, a vapor deposition method is used to accumulate silicon and amorphous silicon dioxide simultaneously so that better cycle characteristics and greater safety are achieved (see Patent Document 1, for example). Moreover, a carbon material (an electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 μm to 50 μm) and a carbon material are mixed and calcined at a high temperature (see Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). To improve the cycle characteristics, a hydrophobic layer such as a silane compound layer is formed on the surface of a silicon material (see Patent Document 9, for example). Moreover, a silicon oxide is used and coated with graphite coating to give electric conductivity so that improved cycle characteristics are achieved (see Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle characteristics (see Patent Document 11, for example). Moreover, a silicon oxide having a silicon-to-oxygen atomicity ratio of 1:y ($0 < y < 2$) is used to improve overcharge and overdischarge characteristics (see Patent Document 12, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346

Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. In addition, when a silicon material is used, the use of a silicon material doped with Li brings higher initial efficiency and capacity retention rate. Such a silicon material doped with Li, however, is less stable to aqueous solvents, lowering the stability of aqueous negative electrode slurry mixed with a silicon material, which is prepared in producing a negative electrode, and has been unsuitable for industrial use.

The present invention was accomplished in view of the above-described problems. It is an object of the present invention to provide a negative electrode material that is capable of stabilizing a slurry prepared in production of a negative electrode for a secondary battery, and capable of improving initial charge-discharge characteristics and cycle characteristics when it is used as a negative electrode active material for a secondary battery; and a mixed negative electrode material containing this negative electrode material. Another object is to provide a method of producing a negative electrode material that is capable of stabilizing a slurry prepared in production of a negative electrode, and capable of improving initial charge-discharge characteristics and cycle characteristics.

Solution to Problem

To achieve the object, the present invention provides a negative electrode material comprising a negative electrode active material particle;
  the negative electrode active material particle comprising a silicon compound particle containing a silicon compound ($SiO_x$: $0.5 \leq x \leq 1.6$),
  wherein the silicon compound particle contains at least one or more of $Li_2SiO_3$ and $Li_4SiO_4$, and
  the negative electrode material further comprises at least one of a metal compound particle containing a metal compound and an aggregate of the metal compound particle.

Since the inventive negative electrode material contains a negative electrode active material particle containing a silicon compound particle (also referred to as a silicon-based active material particle), the battery capacity can be improved. Moreover, incorporating a Li compound in the silicon compound particle makes it possible to reduce irreversible capacity generated in charging. This allows a battery to have improved first time efficiency and cycle characteristics. Further, since the negative electrode material contains a metal compound particle and/or an aggregate thereof together with the silicon compound particle, when the negative electrode material is mixed with an aqueous slurry in the process of producing a negative electrode, the metal compound particle partially reacts with Li ions eluted into the aqueous slurry from the silicon compound particle or the like and suppresses the reaction between the Li ions and water. Hence, the stability of the slurry can be enhanced.

In this case, the metal compound particle preferably contains at least one or more of aluminum, zirconium, and yttrium.

Aluminum, zirconium, and yttrium have adequate reactivity with Li ion. Hence, metal compound particles containing compounds of these metals are more suitable, and the slurry stability can be further enhanced.

Preferably, in this case, the metal compound particle has an average primary particle size of 0.1 µm or more and 4 µm or less, and the aggregate of the metal compound particle has an average secondary particle size of 0.1 µm or more and 20 µm or less.

When the metal compound particle has an average primary particle size of 0.1 µm or more and 4 µm or less, the metal compound particle has a large specific surface area, thereby increasing the reaction area between the metal compound particle and Li ions eluted into an aqueous slurry, making it possible to further stabilize the aqueous slurry. Thus, the cycle characteristics and the first time charge-discharge efficiency of the battery can be improved. Meanwhile, at a portion in the negative electrode material where the negative electrode active material particle exists in a low proportion, Li is likely to precipitate. Nevertheless, when the aggregate of the metal compound particle has an average secondary particle size of 0.1 µm or more and 20 µm or less, the portion where the negative electrode active material particle exists in a low proportion is rarely formed in the negative electrode material, so that the Li precipitation can be suppressed particularly during charging. Thus, the safety of the battery can also be improved.

The metal compound preferably has a bond between a metal element and oxygen.

The metal compound having a bond between a metal element and oxygen has adequate reactivity with Li ion, and can further enhance the slurry stability.

Moreover, the metal compound is preferably any one of an oxide, a phosphate, and a silicate.

Since such metal compounds have adequate reactivity with Li ion, it is possible to further enhance the slurry stability.

Further, the inventive negative electrode material is preferably such that
  an X-ray fluorescence spectrum obtained from X-ray fluorescence analysis of the negative electrode material has a peak indicating an aluminum Kα line around 1.49 keV and a peak indicating a silicon Kα line around 1.74 keV, and
  a ratio Al(Kα)/Si(Kα) of an intensity of the peak indicating the aluminum Kα line to an intensity of the peak indicating the silicon Kα line is 0.002 or more and 0.01 or less.

When the peak intensity ratio is within the above range, it can be said that the negative electrode material contains the metal compound particle and so forth containing an aluminum compound in appropriate amounts relative to silicon. Hence, it is possible to obtain the effect of stabilizing slurry from the metal compound particle. In addition, it can be said that aluminum is not excessive so that an increase in resistance can be suppressed, while the silicon amount is also sufficiently secured. Accordingly, sufficient battery capacity is obtained from the negative electrode material.

Moreover, in the inventive negative electrode material, the X-ray fluorescence spectrum obtained from X-ray fluorescence analysis of the negative electrode material preferably has a peak indicating a zirconium Kα line around 15.74 keV and a peak indicating a zirconium Kβ, line around 17.66 keV.

When such zirconium-related peaks are obtained, it can be said that the negative electrode material contains the metal compound particle and so forth containing a zirconium compound in appropriate amounts. Hence, it is possible to more surely obtain the effect of stabilizing slurry by the metal compound particle including a zirconium compound.

Further, in the inventive negative electrode material, the X-ray fluorescence spectrum obtained from X-ray fluorescence analysis of the negative electrode material preferably has a peak indicating a yttrium Kα line around 14.93 keV but no peak indicating a yttrium Kβ, line around 16.73 keV.

When the X-ray fluorescence spectrum measured from the negative electrode material has a peak indicating a yttrium Kα line but no peak indicating a yttrium Kβ line, it can be said that an appropriate content of yttrium exists. Hence, it is possible to more surely obtain the effect of stabilizing slurry; moreover, Li precipitation can be suppressed while a battery is being charged.

Preferably, the silicon compound particle has a diffraction peak attributable to a Si(111) crystal face obtained from an X-ray diffraction using a Cu-Kα line, a half value width (2θ) of the diffraction peak is 1.20 or more, and a crystallite size corresponding to the crystal face is 7.5 nm or less.

When the negative electrode material with the silicon compound particle having the above silicon crystallinity is used for a lithium-ion secondary battery, more favorable cycle characteristics and initial charge-discharge characteristics are obtained.

Further, in the inventive negative electrode material, the silicon compound particle preferably satisfies a relationship of A>B where A is a maximum peak intensity value in Si and Li silicate regions given as a chemical shift value of −60 to −95 ppm, and B is a peak intensity value in a $SiO_2$ region given as a chemical shift value of −96 to −150 ppm, the values being obtained from a $^{29}$Si-MAS-NMR spectrum of the silicon compound particle.

In the silicon compound particle, when the amounts of Si and $Li_2SiO_3$ are larger based on the $SiO_2$ component, the effect of improving the battery properties through the Li insertion is sufficiently obtained from the negative electrode material.

Further, the negative electrode active material particle preferably has a median diameter of 1.0 μm or more and 15 μm or less.

When the median diameter of the negative electrode active material particle is 1.0 μm or more, it is possible to suppress an increase in irreversible battery capacity due to the increased specific surface area. Meanwhile, when the median diameter is 15 μm or less, the particle is hard to break and thereby prevented from forming a new surface.

Further, the negative electrode active material particle preferably has a surface layer portion containing a carbon material.

When the surface layer portion of the negative electrode active material particle contains a carbon material as described above, the electric conductivity is improved.

Furthermore, an average thickness of the carbon material is preferably 10 nm or more and 5000 nm or less.

When the carbon material has an average thickness of 10 nm or more, the electric conductivity is improved. Moreover, when the carbon material for covering has an average thickness of 5000 nm or less, the use of the negative electrode material containing such negative electrode active material particles for a lithium-ion secondary battery makes it possible to secure a sufficient amount of the silicon compound particles therein, thereby preventing lowering of the battery capacity.

In addition, to achieve the above-described object, the present invention provides a mixed negative electrode material comprising:

the negative electrode material described above; and a carbon-based active material.

When the material for forming a negative electrode active material layer contains a carbon-based active material together with the inventive negative electrode material (silicon-based negative electrode material) as described above, it is possible to improve the electric conductivity of the negative electrode active material layer and to ease the expanding stress due to charging. The battery capacity is also successfully increased by mixing the silicon-based negative electrode material and a carbon-based active material.

Moreover, to achieve the above-described object, the present invention provides a method of producing a negative electrode material containing a negative electrode active material particle including a silicon compound particle, comprising the steps of:

preparing a silicon compound particle containing a silicon compound ($SiO_x$: 0.5≤x≤1.6);

inserting Li into the silicon compound particle so as to include at least one or more of $Li_2SiO_3$ and $Li_4SiO_4$ to prepare a negative electrode active material particle; and mixing the negative electrode active material particle with at least one of a metal compound particle containing a metal compound and an aggregate of the metal compound particle to produce a negative electrode material.

When the negative electrode active material particle containing the Li-inserted silicon compound particle is mixed with a metal compound particle and/or an aggregate thereof to produce a negative electrode material as described above, it is possible to produce a negative electrode material which is capable of stabilizing an aqueous slurry prepared in production of a negative electrode, and which has high capacity and favorable cycle characteristics and initial charge-discharge characteristics when used as a negative electrode material for a secondary battery.

Advantageous Effects of Invention

The inventive negative electrode material is capable of stabilizing an aqueous slurry prepared in production of a negative electrode and brings high capacity and favorable cycle characteristics and initial charge-discharge characteristics when used as a negative electrode material for a secondary battery. Moreover, the mixed negative electrode material containing this negative electrode material also brings the same effects. Further, the inventive method of producing a negative electrode material makes it possible to produce a negative electrode material which is capable of stabilizing an aqueous slurry prepared in production of a negative electrode, and which has favorable cycle characteristics and initial charge-discharge characteristics when used as a negative electrode active material for a lithium ion secondary battery.

BRIEF DESCRIPTION OF DRAWINGS

FIG. 1 is a sectional view showing an example of configuration of a negative electrode for a non-aqueous electrolyte secondary battery that contains the inventive negative electrode active material.

FIG. 2 is an example of a $^{29}$Si-MAS-NMR spectrum measured for a silicon compound particle modified by oxidation-reduction method;

FIG. 3 is an example of a $^{29}$Si-MAS-NMR spectrum measured for a silicon compound particle modified by thermal doping method;

FIG. 4 is a view showing an example of configuration of a lithium secondary battery (laminate film type) that contains the inventive negative electrode active material;

FIG. 5 is an X-ray fluorescence spectrum obtained in X-ray fluorescence analysis for checking Al(Kα)/Si(Kα) in a negative electrode material of Example 1-1;

FIG. 6 is an enlarged graph of the X-ray fluorescence spectrum in FIG. 5, in which the X-ray energy ranges from 1.3 to 1.6 keV;

FIG. 7 is an X-ray fluorescence spectrum obtained in X-ray fluorescence analysis for checking zirconium (Zr) and yttrium (Y) peaks in the negative electrode material of Example 1-1; and FIG. 8 is a graph showing a relationship between the ratio of a silicon-based active material particle to a total amount of a negative electrode active material and an increasing rate of battery capacity of a secondary battery.

DESCRIPTION OF EMBODIMENTS

Hereinafter, embodiments of the present invention will be described, but the present invention is not limited thereto.

As described above, for increasing battery capacity of lithium ion secondary batteries, it has been investigated a method using a negative electrode mainly made from a silicon material as a negative electrode for a lithium ion secondary battery. Such a lithium ion secondary battery using a silicon material is desired to have slurry stability, initial charge-discharge characteristics, and cycle characteristics almost equivalent to those of a lithium ion secondary battery using a carbon-based active material. However, such a negative electrode material having slurry stability, initial charge-discharge characteristics, and cycle characteristics equivalent to those of a lithium ion secondary battery using a carbon-based active material has not been proposed yet.

Accordingly, the inventors have diligently investigated to obtain a negative electrode material for a secondary battery to give higher battery capacity, as well as favorable slurry stability, cycle characteristics, and first time efficiency; thereby providing the present invention.

[Inventive Negative Electrode Material]

The inventive negative electrode material contains a negative electrode active material particle. This negative electrode active material particle includes a silicon compound particle containing a silicon compound ($SiO_x$: $0.5 \leq x \leq 1.6$). This silicon compound particle contains at least one or more kinds of lithium silicates $Li_2SiO_3$ and $Li_4SiO_4$. In this manner, the inventive negative electrode material contains a negative electrode active material particle containing a silicon compound particle, and is capable of improving battery capacity thereby. Further, since the silicon compound particle contains lithium silicate(s) as described above, it is possible to reduce irreversible capacity generated in charging. As a result, the battery capacity, cycle characteristics, and first time charge-discharge efficiency of a secondary battery can be improved.

The inventive negative electrode material further contains at least one of a metal compound particle containing a metal compound and an aggregate of the metal compound particle. Such a metal compound particle and an aggregate thereof are capable of stabilizing an aqueous slurry which is prepared by mixing with a negative electrode material in producing a negative electrode. Conventionally, when a negative electrode material containing Li-inserted silicon compound particles is mixed with an aqueous slurry in production of a negative electrode, Li ions are eluted and the slurry becomes unstable. Consequently, for example, it becomes difficult to produce the electrode, or extra Li compound is formed on the surface of the electrode prepared from such slurry. The battery properties such as cycle characteristics and first time charge-discharge efficiency are lowered; particularly, the cycle characteristics are greatly lowered. In contrast, as in the present invention, in the negative electrode material containing at least one of a metal compound particle and an aggregate of the metal compound particle, the metal compound particle reacts with eluted Li ions, and thereby making it possible to enhance the slurry stability. As a result, in comparison with conventional negative electrode materials, the inventive negative electrode material is capable of improving the battery properties of a secondary battery, such as first time efficiency and cycle characteristics; particularly, the cycle characteristics can be greatly improved.

Moreover, the metal compound particle contained in the inventive negative electrode material preferably contains at least one or more of aluminum, zirconium, and yttrium. The reactivity of compounds of these metals with Li ion is adequate, and the effect of stabilizing slurry can be further enhanced. Further, in the present invention, the metal compound particle may be mixed with, for example, aluminum compound particle, zirconium compound particle, and yttrium compound particle. Alternatively, the metal compound particle may be particles containing two or more metal compounds of an aluminum compound, a zirconium compound, and a yttrium compound.

The metal compound contained in the metal compound particle preferably has a bond between a metal element and oxygen. Such a metal compound has adequate reactivity with Li ion, and hence is capable of further stabilizing an aqueous slurry. The metal compound having a bond between a metal element and oxygen is more preferably any one of an oxide, a phosphate, and a silicate. Such metal compounds have more adequate reactivity with Li ion, and are capable of particularly stabilizing an aqueous slurry. Incidentally, the presence of the metal compound having a bond between a metal element and oxygen can be checked by XPS (X-ray photoelectron spectroscopy).

Additionally, the inventive negative electrode material preferably contains any one or more metal elements of aluminum, zirconium, and yttrium so as to satisfy the following feature(s) defined by X-ray fluorescence spectrum. In an X-ray fluorescence spectrum obtained by X-ray fluorescence analysis, the intensity of a peak derived from each metal varies depending on not only the content (mass ratio, etc.) of the metal compound particle in the negative electrode material, but also the particle size and so forth of the metal compound particle. Hence, the definition by a peak derived from each metal in an X-ray fluorescence spectrum includes not only a preferable mass ratio of each metal compound particle in the negative electrode material, but also information on preferable particle size.

First of all, regarding aluminum, an X-ray fluorescence spectrum obtained from X-ray fluorescence analysis of the negative electrode material preferably has a peak indicating an aluminum Kα line around 1.49 keV and a peak indicating a silicon Kα line around 1.74 keV, and a ratio Al(Kα)/Si (Kα) of an intensity of the peak indicating the aluminum Kα line to an intensity of the peak indicating the silicon Kα line is 0.002 or more and 0.01 or less. When aluminum is contained so as to satisfy the range of this peak intensity ratio, it can be said that the negative electrode material contains the metal compound particle, which contains an aluminum compound, with an appropriate size and an appropriate amount. Hence, while the effect of stabilizing slurry is obtained from the metal compound particle, an increase in electric resistance can also be suppressed, so that favorable battery properties are obtained. Additionally, it can be said that the aluminum compound is not excessive and the silicon amount is also sufficiently secured. Accordingly, sufficient battery capacity is obtained from the negative electrode material. Moreover, when an X-ray fluorescence spectrum exhibits such peaks, it can be said, although depending on the particle size of the metal compound particle, that the negative electrode material contains aluminum in an abundance ratio ranging from approximately 0.03 mass % or more and 1 mass % or less based on silicon oxide particle. Particularly, the content of 0.03 mass % or more and 0.6 mass % or less is preferable because favorable electric conductivity is obtained.

Moreover, regarding zirconium, the X-ray fluorescence spectrum obtained from X-ray fluorescence analysis of the inventive negative electrode material preferably has a peak indicating a zirconium Kα line around 15.74 keV and a peak indicating a zirconium Kβ line around 17.66 keV. When such zirconium-related peaks are obtained, it can be said that the negative electrode material contains the metal compound particle, which contains a zirconium compound, with an appropriate size and an appropriate amount. Hence, the effect of stabilizing slurry can be more surely obtained from the metal compound particle containing a zirconium compound. The negative electrode material preferably contains zirconium in an abundance ratio ranging from approximately 10 ppm by mass or more and 1000 ppm by mass or less based on silicon oxide particle. Particularly, the content ranging from 30 ppm by mass or more and 300 ppm by mass or less is more preferable. This is because the effect of stabilizing slurry can be obtained while more favorable electric conductivity is secured.

Further, regarding yttrium, the X-ray fluorescence spectrum obtained from X-ray fluorescence analysis of the inventive negative electrode material preferably has a peak indicating a yttrium Kα line around 14.93 keV but no peak indicating a yttrium Kβ line around 16.73 keV. When the X-ray fluorescence spectrum measured for the negative electrode material has a peak indicating a yttrium Kα line but no peak indicating a yttrium Kβ line, it can be said that the metal compound particle, which contains a yttrium compound, is contained with an appropriate size and an appropriate amount. Hence, it is possible to more surely obtain the effect of stabilizing slurry, and to suppress Li precipitation while a battery is being charged. The negative electrode material preferably contains yttrium in an abundance ratio ranging from approximately 1 ppm by mass or more and 30 ppm by mass or less based on silicon oxide particle.

The X-ray fluorescence analysis as described above can be conducted under the following conditions.

Apparatus: energy dispersive X-ray fluorescence spectroscope S2 Ranger (made by Bruker Corp.)

(1) Conditions for checking intensity ratio Al(Kα)/Si(Kα)
Acceleration Voltage: 20 kV
Target: Pd
Atmosphere: He
Vessel: liquid cup
Filter: none
Detector: silicon drift detector (2) Conditions for checking zirconium (Zr) and yttrium (Y) peaks
Acceleration Voltage: 40 kV
Target: Pd
Atmosphere: He
Vessel: liquid cup
Filter: Al 500 μm
Detector: silicon drift detector Moreover, in this case, preferably, the metal compound particle has an average primary particle size of 0.1 μm or more and 4 μm or less, and the aggregate of the metal compound particle has an average secondary particle size of 0.1 μm or more and 20 μm or less. When the metal compound particle has an average primary particle size of 4 μm or less, the metal compound particle has a large specific surface area, so that the reaction area between Li ions eluted into an aqueous slurry and the metal compound particle is large, making it possible to further stabilize the aqueous slurry. Meanwhile, when the average primary particle size is 0.1 μm or more, elution of minute amounts of impurities contained in the metal compound particle can be suppressed, making it possible to further stabilize an aqueous slurry. Meanwhile, at a portion in the negative electrode material where the negative electrode active material particle exists in a low proportion, Li is likely to precipitate. Nevertheless, when the aggregate of the metal compound particle has an average secondary particle size of 20 μm or less, the portion where the negative electrode active material particle exists in a low proportion is rarely formed in the negative electrode material, so that the Li precipitation can be suppressed particularly during charging. Meanwhile, when the average secondary particle size is 0.1 μm or more, elution of minute amounts of impurities contained in the metal compound particle can be suppressed, making it possible to further stabilize an aqueous slurry. The particle sizes of the metal compound particle and the aggregate thereof can be calculated by image analysis using SEM-EDX (scanning electron microscope—energy dispersive X-ray spectroscopy). Note that when no aggregate is formed, the value of the secondary particle size is regarded as the same as the primary particle size.

Preferably, the silicon compound particle constituting the negative electrode active material particle has a diffraction peak attributable to a Si(111) crystal face obtained from an X-ray diffraction using a Cu-Kα line, a half value width (2θ) of the diffraction peak is 1.2° or more, and a crystallite size corresponding to the crystal face is 7.5 nm or less. This peak appears around 2θ=28.4±0.5° when the crystallinity is high (when the half value width is narrow). In the silicon compound particle, the lower the silicon crystallinity of the silicon compound, the better. Particularly, when the content of the Si crystal is lower, the battery properties can be improved more, and further stable Li compound can be formed.

Moreover, in the present invention, the silicon compound particle preferably satisfies a relationship of A>B where A is a maximum peak intensity value in Si and Li silicate regions given as a chemical shift value of −60 to −95 ppm, and B is a peak intensity value in a $SiO_2$ region given as a chemical shift value of −96 to −150 ppm, the values being obtained from a $^{29}$Si-MAS-NMR spectrum of the silicon compound particle. In the silicon compound particle, when the amount of silicon component or $Li_2SiO_3$ is relatively large based on $SiO_2$ component, the effect of improving the battery properties through the Li insertion is sufficiently obtained. Note that the $^{29}$Si-MAS-NMR measurement can be performed under the following conditions. $^{29}$Si MAS NMR (magic angle spinning-Nuclear Magnetic Resonance)

Apparatus: a 700-NMR spectroscope made by Bruker Corp.,
Probe: a 4-mm-HR-MAS rotor, 50 μL,
Sample Rotation Speed: 10 kHz,
Temperature of Measurement Environment: 25° C.

Moreover, in the inventive negative electrode material, the negative electrode active material particle preferably has a surface layer portion containing a carbon material. The negative electrode active material particle improves the electric conductivity by containing a carbon material in the surface layer portion. Accordingly, when such a negative electrode material is used for a secondary battery, the battery properties are successfully improved.

Additionally, an average thickness of the carbon material of the surface layer portion of the negative electrode active material particle is preferably 10 nm or more and 5000 nm or less. When the carbon material has an average thickness of 10 nm or more, the electric conductivity is improved. When the carbon material for covering has an average thickness of 5000 nm or less, it is possible to prevent lowering of the battery capacity in case of using the negative electrode material containing such negative electrode active material particles for a lithium-ion secondary battery.

The average thickness of this carbon material can be calculated by the following procedure, for example. First, the negative electrode active material particles are observed through TEM (transmission electron microscope) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points as widely and randomly as possible without focusing a particular place. Lastly, the average value of the thicknesses of carbon material at the 15 points is calculated.

The covering rate of carbon material is not particularly limited, but is desirable to be as high as possible. The covering rate of 30% or more is preferable because the electric conductivity is further improved. The covering method with the carbon material is not particularly limited, but a method of carbonizing saccharide and a pyrolysis method of hydrocarbon gas are preferable since they can improve the covering rate.

Further, the negative electrode active material particle preferably has a median diameter ($D_{50}$: particle size when the accumulated volume becomes 50%) of 1.0 μm or more and 15 μm or less. When the median diameter of the negative electrode active material particle is within the above range, lithium ions are easily occluded and released in charging and discharging, and the negative electrode active material particle becomes less liable to break. When the median diameter is 1.0 μm or more, it is possible to decrease the surface area per mass of the negative electrode active material particle to prevent increase of the irreversible battery capacity. On the other hand, when the median diameter is 15 μm or less, the particle becomes less liable to break, thereby being prevented from forming a new surface.

<Negative Electrode for Non-Aqueous Electrolyte Secondary Battery>

Next, a negative electrode for a non-aqueous electrolyte secondary battery containing the inventive negative electrode material (hereinafter, also referred to as a "negative electrode") will be described. FIG. 1 is a sectional view showing an example of configuration of the negative electrode for a non-aqueous electrolyte secondary battery.

[Configuration of Negative Electrode]

As shown in FIG. 1, a negative electrode 10 is constituted to have a negative electrode active material layer 12 on a negative electrode current collector 11. This negative electrode active material layer 12 may be disposed on both sides or only one side of the negative electrode current collector 11. As long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when the negative electrode has an active material layer that expands in charging, the current collector containing the above elements has an effect of suppressing deformation of an electrode including the current collector. Each content of the contained elements is not particularly limited, but is preferably 100 ppm by mass or less. This is because a high effect of suppressing deformation is obtained. Such an effect of suppressing deformation can further improve the cycle characteristics.

The surface of the negative electrode current collector 11 may or may not be roughened. Examples of the roughened negative electrode current collector include a metallic foil subjected to an electrolyzing process, an embossing process, or a chemical etching process, and the like. Examples of the negative electrode current collector that is not roughened include a rolled metallic foil and the like.

[Negative Electrode Active Material Layer]

The negative electrode active material layer 12 contains the inventive negative electrode material. The negative electrode material contains the negative electrode active material particle which is capable of occluding and releasing lithium ions, and at least one of a metal compound particle containing a metal compound and an aggregate of the metal compound particle. In view of battery design, other materials may be further contained, such as a negative electrode binding agent (binder) or a conductive assistant agent.

The negative electrode active material layer 12 may contain a mixed negative electrode material that contains the inventive negative electrode material and a carbon-based active material. Incorporating the carbon-based active material makes it possible to decrease the electric resistance of the negative electrode active material layer and to ease the expanding stress due to charging. As the carbon-based active material, for example, pyrolytic carbons, cokes, glassy carbon fiber, baked organic polymer compounds, carbon black, and the like are usable.

In the mixed material, the mass ratio of the silicon-based negative electrode active material is preferably 6 mass % or more relative to the sum of masses of the negative electrode active material particle (silicon-based negative electrode active material) and the carbon-based active material. When the mass ratio of the silicon-based negative electrode active material is 6 mass % or more relative to the sum of masses of the silicon-based negative electrode active material and the carbon-based active material, it is possible to surely improve the battery capacity.

As described above, the inventive negative electrode active material contains a silicon compound particle, and the silicon compound particle is a silicon oxide material containing a silicon compound ($SiO_x$: $0.5 \leq x \leq 1.6$), in which "x" is preferably close to 1 because higher cycle characteristics are successfully obtained. Incidentally, the composition of silicon compound in the present invention does not necessarily mean purity of 100%, and may contain a small quantity of impurity elements.

In the inventive negative electrode active material, the silicon compound particle contains at least one or more of $Li_2SiO_3$ and $Li_4SiO_4$. These are $SiO_2$ components in a silicon compound which become unstable upon insertion and release of lithium when a battery is charged and discharged, and which are modified to another lithium silicates in advance. Thus, the irreversible capacity generated in charging can be reduced.

When at least one or more of $Li_4SiO_4$ and $Li_2SiO_3$ is present in the bulk of the silicon compound particle, the battery properties are improved. When the two Li compounds are co-present, the battery properties are further improved. Note that these lithium silicates can be quantified by NMR (Nuclear Magnetic Resonance) or XPS (X-ray photoelectron spectroscopy). The XPS and NMR measurements can be performed under the following conditions, for example.

XPS
  Apparatus: an X-ray photoelectron spectrometer,
  X-ray Source: a monochromatic Al-Kα line,
  X-ray Spot Diameter: 100 μm,
  Ar-ion Gun Sputtering Conditions: 0.5 kV/2 mm×2 mm.

$^{29}$Si MAS NMR (magic angle spinning-Nuclear Magnetic Resonance)
  Apparatus: a 700-NMR spectroscope made by Bruker Corp.,
  Probe: a 4-mm-HR-MAS rotor, 50 μL,
  Sample Rotation Speed: 10 kHz,
  Temperature of Measurement Environment: 25° C.

As the negative electrode binder contained in the negative electrode active material layer, any one or more of polymer material, synthetic rubber, and so on are usable, for example. Illustrative examples of the polymer material include polyvinylidene fluoride, polyimide, polyamideimide, aramid, polyacrylic acid, lithium polyacrylate, carboxymethyl cellulose, and the like. Illustrative examples of the synthetic rubber include styrene-butadiene rubber, fluororubber, ethylene-propylene-diene, and the like.

As the negative electrode conductive assistant agent, any one or more of a carbon material, such as carbon black, acetylene black, graphite, ketjen black, carbon nanotube, and carbon nanofiber are usable, for example.

The negative electrode active material layer is formed by an application method, for example. The application method is a method in which a negative electrode active material particle is mixed with the above binder and so on, optionally with a conductive assistant agent or a carbon-based active material particle; and the resulting negative electrode material is dispersed to organic solvent, water, or the like so as to be applied to a negative electrode current collector or the like.

[Method of Producing Negative Electrode Material and Negative Electrode]

The negative electrode material and a negative electrode can be produced by the following procedures, for example. First, a method of producing a negative electrode material used for a negative electrode will be described.

In the beginning, a silicon compound particle containing a silicon compound ($SiO_x$: $0.5 \leq x \leq 1.6$) is prepared. Next, Li is inserted into the silicon compound particle so as to include at least one or more of $Li_2SiO_3$ and $Li_4SiO_4$. In this manner, a negative electrode active material particle is prepared. Next, the prepared negative electrode active material particle is mixed with at least one of a metal compound particle containing a metal compound and an aggregate of the metal compound particle to produce a negative electrode material.

More specifically, the negative electrode active material can be produced as follows. First, a raw material which generates silicon oxide gas is heated in the presence of inert gas under reduced pressure in a temperature range of 900° C. to 1600° C. to generate silicon oxide gas. When considering the existence of oxygen on the surface of the metallic silicon powder and slight oxygen in a reaction furnace, the mixing mole ratio is desirably in a range of 0.8<metallic silicon powder/silicon dioxide powder<1.3.

The generated silicon oxide gas is solidified and deposited on an absorbing plate. Subsequently, the deposit of silicon oxide is taken out under the condition of the temperature in the reaction furnace of 100° C. or below, and then the deposit is ground and powdered using a ball mil, a jet mil, or the like. Thus obtained powder may be classified. In the present invention, the distribution of particle size of the silicon compound particle can be controlled in the pulverization step and the classification step. As described above, the silicon compound particle can be produced. Note that the Si crystallite in the silicon compound particle can be controlled by changing the evaporation temperature or a heat treatment after the preparation.

Here, on the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, silicon compound particles are set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of the active material particles. After raising the furnace temperature to a prescribed temperature, a carbon layer is formed onto the surface of the silicon compound particles. The hydrocarbon gas to be a raw material of the carbon material is not particularly limited, but preferably has a composition of $C_nH_m$ where $n \leq 3$. When $n \leq 3$, it is possible to decrease the production cost and to improve the properties of the decomposition products.

Next, Li is inserted into the silicon active material particles prepared as described above so as to include at least one or more of $Li_2SiO_3$ and $Li_4SiO_4$. Li is preferably inserted by a thermal doping method.

The modification by the thermal doping method is possible, for example, by mixing the silicon active material particles with LiH powder or Li powder, followed by heating under a non-oxidizing atmosphere. As the non-oxidizing atmosphere, for example, Ar atmosphere or the like may be used. More specifically, first, under an Ar atmosphere, the silicon oxide powder is sufficiently mixed with LiH powder or Li powder, and sealed. The whole sealed vessel is stirred so as to make the mixture uniform. Then, the mixture is heated in a range of 700° C. to 750° C. for the modification. In this case, in order to release a portion of active Li from the silicon compound to further stabilize the slurry, the heated powder may be sufficiently cooled and then washed with alcohol, alkaline water, weak acid, or pure water.

Alternatively, Li may be inserted into the silicon active material particles by an oxidation-reduction method. In the modification by the oxidation-reduction method, for example, first, lithium is dissolved in an ether-based solvent to prepare a solution A. The silicon active material particles are immersed in the solution A, so that lithium can be inserted. The solution A may further contain a polycyclic aromatic compound or a linear polyphenylene compound. The resulting silicon oxide is heated at 400 to 800° C. to stabilize the Li compound(s). Moreover, after the lithium insertion, the silicon active material particles may be immersed in a solution B containing a polycyclic aromatic compound or a derivative thereof to release active lithium from the silicon active material particles. As a solvent of the solution B, for example, an ether-based solvent, a ketone-based solvent, an ester-based solvent, an alcohol-based solvent, an amine-based solvent, or a mixed solvent thereof can be used. Further, after immersed in the solution B, the silicon active material may be immersed in a solution C containing an alcohol-based solvent, a carboxylic acid-based solvent, water, or a mixed solvent thereof, to release a larger amount of active lithium from the silicon active material particles. As described above, after the lithium insertion, when active lithium is released, a negative electrode active material having a higher water resistance is obtained.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like. Among these, tetrahydrofuran, dioxane, 1,2-dimethoxy ethane, and diethylene glycol dimethyl ether are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, pentacene, pyrene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, pentacene, pyrene, triphenylene, coronene, chrysene, and derivatives thereof.

Moreover, as the ether-based solvent of the solution B, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like.

As the ketone-based solvent, acetone, acetophenone, and the like may be used.

As the ester-based solvent, methyl formate, methyl acetate, ethyl acetate, propyl acetate, isopropyl acetate, and the like may be used.

As the alcohol-based solvent, methanol, ethanol, propanol, isopropyl alcohol, and the like may be used.

As the amine-based solvent, methyl amine, ethyl amine, ethylene diamine, and the like may be used.

When the solution C is used, solvents may be mixed in multiple stages such that, for example, a ketone-based solvent and a silicon compound are mixed and stirred, and then the alcohol-based solvent is added.

As the alcohol-based solvent of the solution C, methanol, ethanol, propanol, isopropyl alcohol, and the like may be used.

As the carboxylic acid-based solvent, formic acid, acetic acid, oxalic acid, and the like may be used.

Note that when the modification is performed by the thermal doping method, the $^{29}$Si-MAS-NMR spectrum obtained from the silicon compound particle is different from that when the oxidation-reduction method is adopted. FIG. 2 shows an example of a $^{29}$Si-MAS-NMR spectrum measured for the silicon compound particle modified by the oxidation-reduction method. In FIG. 2, a peak given near −75 ppm is a peak derived from $Li_2SiO_3$, and a peak given from −80 to −100 ppm is a peak derived from Si. Note that, from −80 to −100 ppm, a peak of a Li silicate other than $Li_2SiO_3$ or $Li_4SiO_4$ may appear in some cases.

Meanwhile, FIG. 3 shows an example of a $^{29}$Si-MAS-NMR spectrum measured for the silicon compound particle modified by the thermal doping method. In FIG. 3, a peak given near −75 ppm is a peak derived from $Li_2SiO_3$, and a peak given from −80 to −100 ppm is a peak derived from Si. Note that, from −80 to −100 ppm, a peak of a Li silicate other than $Li_2SiO_3$ or $Li_4SiO_4$ may appear in some cases. In addition, from an XPS spectrum, a peak of $Li_4SiO_4$ can be checked.

Subsequently, the negative electrode active material particle is mixed with at least one of a metal compound particle and an aggregate thereof. As the mixing method, dry mixing such as mixing by stirring, rolling, shearing, or processes may be employed; alternatively, wet mixing may be employed in which the metal compound particle dispersed in a solution is sprayed onto the negative electrode active material particle.

The negative electrode material produced as described above is optionally mixed with other materials such as a negative electrode binder and a conductive assistant agent. Then, organic solvent, water, or the like is added to the mixture to form slurry. Subsequently, the slurry is applied onto the surface of a negative electrode collector and dried to form a negative electrode active material layer. In this case, heat pressing and so on may be performed in accordance with needs. As described above, a negative electrode is successfully produced.

<Lithium-Ion Secondary Battery>

Next, a lithium-ion secondary battery containing the inventive negative electrode material will be described. Here exemplifies a lithium-ion secondary battery of a laminate film type as a concrete example.

[Configuration of Laminate Film Type Lithium-Ion Secondary Battery]

A laminate film type lithium-ion secondary battery 20 shown in FIG. 4 mainly includes a wound electrode body 21 stored in sheet-shaped outer parts 25. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 22 attached to the positive electrode and a negative-electrode lead 23 attached to the negative electrode. The outermost circumference of the electrode bodies is protected by a protecting tape.

The positive-electrode lead and the negative-electrode lead, for example, extend from the interior of the outer parts 25 toward the exterior in one direction. The positive-electrode lead 22 is made of, for example, a conductive material such as aluminum; the negative-electrode lead 23 is made of, for example, a conductive material such as nickel or copper.

An example of the outer part 25 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 21. The fusion-bond layer may be, for example, a film such as a polyethylene or polypropylene film; the metallic layer may be aluminum foil, for example; the protecting layer may be nylon, for example.

The space between the outer parts 25 and the positive and negative electrode leads is filled with close adhesion films 24 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains any one kind or two kinds or more of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among these described positive electrode materials, a compound containing at least one of nickel, iron, manganese, and cobalt is preferable. The chemical formula of this compound is expressed by, for example, $Li_xM1O_2$ or $Li_yM2PO_4$, where M1 and M2 represent at least one kind of transition metal elements, and "x" and "y" each represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$), a lithium nickel complex oxide ($Li_xNiO_2$), and the like. Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)), and the like. This is because higher battery capacity and excellent cycle characteristics are obtained using the positive electrode materials described above.

[Negative Electrode]

The negative electrode has a configuration which is similar to that of the above negative electrode 10 for a lithium ion secondary battery shown in FIG. 1, and, for example, has the negative electrode active material layers 12 disposed on both faces of the current collector 11. The negative electrode preferably has a negative-electrode charge capacity larger than electrical capacitance (a battery charge capacity) provided by the positive electrode active material, for this negative electrode itself can inhibit the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not correspond to a positive electrode active material layer to be faced. This intends to perform a stabilized battery design.

A non-facing area, that is, the above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films to give laminate structure. Examples of the synthetic resin include polytetrafluoroethylene, polypropylene, and polyethylene.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or combinations thereof is preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

For an alloyed negative electrode, the solvent particularly preferably contains at least one of halogenated chain carbonate ester and halogenated cyclic carbonate ester. Such a solvent enables the negative electrode active material to be coated with a stable coating at charging or discharging and particularly charging. The halogenated chain carbonate ester is chain carbonate ester having halogen as a constituent element (at least one hydrogen is substituted by halogen). And the halogenated cyclic carbonate ester is cyclic carbonate ester having halogen as a constituent element (that is, at least one hydrogen is substituted by halogen).

The kind of halogen is not particularly limited, but fluorine is preferable, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate, and the like. Examples of the halogenated cyclic carbonate ester include 4-fluoro-1,3-dioxolane-2-one, 4,5-difluoro-1,3-dioxolane-2-one, and the like.

The solvent preferably contains an unsaturated carbon bond cyclic carbonate ester as an additive, for this enables the formation of a stable coating on a negative electrode at charging and discharging and the inhibition of a decomposition reaction of the electrolyte. Examples of the unsaturated carbon bond cyclic carbonate ester include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. An example of the acid anhydride includes propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably 0.5 mol/kg or more and 2.5 mol/kg or less. This content enables high ionic conductivity.

[Method of Producing Laminate Film Type Secondary Battery]

The present invention makes it possible to produce a negative electrode using a negative electrode material produced by the inventive method of producing a negative electrode material described above, and to produce a lithium-ion secondary battery using the produced negative electrode.

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for a lithium ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. With ultrasonic welding or the like, the positive-electrode lead 22 is attached to the positive electrode current collector and the negative-electrode lead 23 is attached to the negative electrode current collector. Then, the positive and negative electrodes and the separator interposed therebetween are stacked or wound to produce the wound electrode body 21 and a protecting tape is stuck to the outermost circumference of the body. Next, the wound body is flattened. Subsequently, the film-shaped outer part 25 is folded in half to interpose the wound electrode body therebetween. The insulating portions of the outer part are stuck to one another by heat sealing, thereby the wound electrode body is encapsulated with one direction being opened. The close-adhesion films are inserted between the outer part and the positive- and negative-electrode leads. The prepared electrolytic solution is introduced from the opened side in a prescribed amount to perform the impregnation of the electrolytic solution under a vacuum. After the impregnation, the opened side is stuck by vacuum heat sealing. In this manner, the laminate film type lithium-ion secondary battery 20 is successfully produced.

EXAMPLE

Hereinafter, the present invention will be more specifically described by showing Examples of the present invention and Comparative Examples, but the present invention is not limited to these Examples.

Example 1-1

The laminate film type lithium ion secondary battery 20 shown in FIG. 4 was prepared by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide as a positive electrode active material, 2.5 mass % of a positive electrode conductive assistant agent, and 2.5 mass % of a positive electrode binder (polyvinylidene fluoride: PVDF). Then, the positive-electrode mixture was dispersed in an organic solvent (N-methyl-2-pyrrolidone: NMP) to form paste slurry. The slurry was subsequently applied to both surfaces of a positive electrode current collector with a coating apparatus having a die head and dried with a drying apparatus of hot-air type. The positive electrode current collector used here had a thickness of 15 µm. The resultant was finally compressed with a roll press.

Next, a negative electrode was produced. In the beginning, a negative electrode active material was produced by the following procedure. A mixed raw material of metallic silicon and silicon dioxide was introduced into a reaction furnace and deposited on an adsorption plate under an atmosphere with a vacuum degree of 10 Pa. The deposit was sufficiently cooled and then taken out to pulverize the deposit with a ball mill. In thus obtained silicon compound particles, the value of "x" in $SiO_x$ was 0.5. Subsequently, the silicon compound particles were classified to adjust the particle sizes. Then, thermal decomposition CVD was performed to coat the surfaces of the silicon compound particles with carbon material.

Subsequently, the silicon compound particles were modified through lithium insertion by the thermal doping method.

First, under an Ar atmosphere, the silicon compound particles were sufficiently mixed with LiH powder and sealed. The whole sealed vessel was stirred so as to make the mixture uniform. Then, the mixture was heated in a range of 700° C. to 750° C. for the modification. Further, in order to release a portion of active Li from the silicon compound, the heated silicon compound particles were sufficiently cooled and then washed with alcohol. By the above treatments, negative electrode active material particles were prepared.

Next, the negative electrode active material particles were mixed with alumina particles, zirconia particles, and yttria particles to produce a negative electrode material. In the negative electrode material, the mass ratio of aluminum was 0.2 mass %, that of zirconium was 200 ppm by mass, and that of yttrium was 10 ppm. In addition, the metal compound particles including these particles had an average primary particle size of 0.7 μm, and the aggregate had an average secondary particle size of 2 μm.

The negative electrode material at this point was subjected to X-ray fluorescence analysis. The conditions were as follows.

Apparatus: energy dispersive X-ray fluorescence spectroscope S2 Ranger (made by Bruker Corp.)
(1) Conditions for checking intensity ratio Al(Kα)/Si(Kα)
  Acceleration Voltage: 20 kV
  Target: Pd
  Atmosphere: He
  Vessel: liquid cup
  Filter: none
  Detector: silicon drift detector
(2) Conditions for checking zirconium (Zr) and yttrium (Y) peaks
  Acceleration Voltage: 40 kV
  Target: Pd
  Atmosphere: He
  Vessel: liquid cup
  Filter: Al 500 μm
  Detector: silicon drift detector As a result, in checking the intensity ratio Al(Kα)/Si(Kα), spectra as shown in FIGS. 5, 6 were obtained. Note that intensities in the spectra shown in FIGS. 5, 6 are expressed as relative values to Si-Kα line (around 1.74 keV) which is taken as 1. The vertical axes of FIGS. 5, 6 are in logarithmic scale. Additionally, FIG. 6 is an enlarged graph of FIG. 5, in which the X-ray energy ranges from 1.3 to 1.6 keV. As can be seen from FIG. 5, the X-ray fluorescence spectrum has a peak indicating an aluminum Kα line around 1.49 keV and a peak indicating a silicon Kα line around 1.74 keV. Further, as can be seen from FIGS. 5 and 6, the ratio Al(Kα)/Si(Kα) of the intensity of the peak indicating the aluminum Kα line to the intensity of the peak indicating the silicon Kα line was 0.007.

Moreover, FIG. 7 shows the result of checking the zirconium (Zr) and yttrium (Y) peaks. Note that intensities in the spectrum shown in FIG. 7 are relative values to Si-Kα line (around 1.74 keV) which is taken as 1. The vertical axis of FIG. 7 is also in logarithmic scale. As shown in FIG. 7, there were a peak indicating a zirconium Kα line around 15.74 keV of the X-ray energy and a peak indicating a zirconium Kβ line around 17.66 keV. Moreover, there was a peak indicating a yttrium Kα line around 14.93 keV of the X-ray energy but no peak indicating a yttrium Kβ line around 16.73 keV.

Next, this negative electrode material and a carbon-based active material were blended such that the mass ratio of the silicon-based active material particles and the carbon-based active material particles was 1:9 to prepare a mixed negative electrode material. The carbon-based active material used herein was a mixture in which artificial graphite and natural graphite coated with a pitch layer was mixed in a mass ratio of 5:5. The carbon-based active material had a median diameter of 20 μm.

Next, the mixed negative electrode material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents).

As the negative electrode current collector, an electrolytic copper foil with a thickness of 15 μm was used. This electrolytic copper foil contained each 70 ppm by mass of carbon and sulfur. Finally, the negative electrode mixture slurry was applied onto the negative electrode current collector, and subjected to drying at 100° C. for 1 hour under a vacuum. The negative electrode active material layer had a deposited amount of 5 mg/cm$^2$ per unit area on a face of the negative electrode after drying (also referred to as an area density).

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate (LiPF$_6$)) to prepare an electrolytic solution. In this case, the solvent composition was set to FEC:EC:DMC=10:20:70 in a volume ratio, and the content of the electrolyte salt was set to 1.2 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 μm) in which a film mainly composed of porous polyethylene was sandwiched by films mainly composed of porous polypropylene. Then, the electrode body was put between outer parts, and then peripheries excluding one side are hot melted, and thereby the electrode body was stored in the outer parts. The outer part was an aluminum laminate film in which a nylon film, an aluminum foil, and a polypropylene film were laminated. Then, the prepared electrolytic solution was introduced from the open side to perform the impregnation under a vacuum. The open side was then stuck by heat sealing.

On the secondary battery thus produced, the cycle characteristics and the first time charge-discharge characteristics were evaluated.

The cycle characteristics were investigated in the following manner. First, two cycles of charging and discharging were performed at 0.2 C under an atmosphere of 25° C. to stabilize the battery and the discharge capacity in the second cycle was measured. Next, the cycle of charging and discharging was repeated until the total number of cycles reached 499 cycles and the discharge capacity was measured every cycle. Finally, a capacity retention rate (hereinafter, also simply referred to as retention rate) was calculated by dividing the discharge capacity in the 500-th cycle, which was obtained by charging and discharging at 0.2 C, by the discharge capacity in the second cycle. In the normal cycle, that is, in the cycles from the third cycle to 499-th cycle, the charging and discharging were performed at 0.7 C in charging and 0.5 C at discharging.

In investigating the first time charge-discharge characteristics, the first time efficiency (hereinafter, may also be referred to as initial efficiency) was calculated. The first time efficiency was calculated from the equation shown by: first time efficiency (%)=(first time discharge capacity/first time charge capacity)×100. The atmospheric temperature was the same as that in investigating the cycle characteristics.

Examples 1-2 to 1-3, Comparative Examples 1-1, 1-2

Secondary batteries were produced as in Example 1-1 except for adjusting the oxygen amount in the bulk of the silicon compound. In this event, the oxygen amount was adjusted by changing the heating temperature or the ratio of metallic silicon and silicon dioxide in the raw material of the silicon compound. Each "x" value of the silicon compound shown by $SiO_x$ in Examples 1-1 to 1-3 and Comparative Examples 1-1 and 1-2 is shown in Table 1.

In this case, the silicon-based active material particles in Examples 1-1 to 1-3 and Comparative Examples 1-1 and 1-2 had properties as follows. In the negative electrode active material particles, the silicon compound particles contained $Li_2SiO_3$ and $Li_4SiO_4$. Moreover, the silicon compounds each had a diffraction peak attributable to a Si(111) crystal face obtained from the X-ray diffraction, the half value width (2θ) of which was 1.755°. The size of the crystallite corresponding to the Si(111) crystal face was 4.86 nm. In addition, the average thickness of the carbon material which covered the surface was 100 nm. Moreover, the negative electrode active material particles had a median diameter of 6 μm.

Furthermore, in all of Examples and Comparative Examples above, peaks in the Si and Li silicate regions given as the chemical shift value of −60 to −95 ppm appeared which were obtained from the $^{29}Si$-MAS-NMR spectra. Moreover, in all of Examples and Comparative Examples above, the relationship of A>B was satisfied where A is the maximum peak intensity value in the Si and Li silicate regions given as the chemical shift value of −60 to −95 ppm, and B is the peak intensity value in the $SiO_2$ region given as the chemical shift value of −96 to −150 ppm, the values being obtained from the $^{29}Si$-MAS-NMR spectrum.

Table 1 shows the evaluation results of Examples 1-1 to 1-3 and Comparative Examples 1-1 and 1-2.

TABLE 1

SiOx $D_{50}$ = 6 μm; graphite (natural graphite:artificial graphite = 5:5): $D_{50}$ = 20 μm;
SiOx ratio 10 mass %; $Li_2SiO_3$, $Li_4SiO_4$; carbon material: average thickness 100 nm; half value width 1.755°, crystallite 4.86 nm; modification method: thermal doping; A > B; metal compound particles: alumina particles, zirconia particles, yttria particles, primary particle size 0.7 μm, secondary particle size 2 μm;
Al(Kα)/Si(Kα) = 0.007, Zr-Kα peak: present, Zr-Kβ peak: present, Y-Kα peak: present, Y-Kβ peak: absent

| Table 1 | x | Capacity retention rate (%) | Initial efficiency (%) |
|---|---|---|---|
| Comparative Example 1-1 | 0.3 | 45 | 86.3 |

TABLE 1-continued

SiOx $D_{50}$ = 6 μm; graphite (natural graphite:artificial graphite = 5:5): $D_{50}$ = 20 μm;
SiOx ratio 10 mass %; $Li_2SiO_3$, $Li_4SiO_4$; carbon material: average thickness 100 nm; half value width 1.755°, crystallite 4.86 nm; modification method: thermal doping; A > B; metal compound particles: alumina particles, zirconia particles, yttria particles, primary particle size 0.7 μm, secondary particle size 2 μm;
Al(Kα)/Si(Kα) = 0.007, Zr-Kα peak: present, Zr-Kβ peak: present, Y-Kα peak: present, Y-Kβ peak: absent

| Table 1 | x | Capacity retention rate (%) | Initial efficiency (%) |
|---|---|---|---|
| Example 1-1 | 0.5 | 81.0 | 87.8 |
| Example 1-2 | 1 | 81.3 | 88.2 |
| Example 1-3 | 1.6 | 80.7 | 87.7 |
| Comparative Example 1-2 | 1.8 | — | — |

As shown in Table 1, when the value of "x" in the silicon compound shown by SiOx was out of the range of 0.5≤x≤1.6, the battery properties were lowered. For example, when oxygen was insufficient (x=0.3) as shown in Comparative Example 1-1, the first time efficiency was improved, but the capacity retention rate was seriously lowered. On the other hand, as shown in Comparative Example 1-2, larger oxygen amount (x=1.8) decreased the electric conductivity and failed to substantially exhibit the capacity of the silicon oxide, and the evaluation had to be stopped thereby.

Examples 2-1, 2-2

Secondary batteries were prepared under the same conditions as in Example 1-2 except for changing the kind of lithium silicate to be incorporated inside the silicon compound particles as shown in Table 2. The cycle characteristics and first time efficiencies were evaluated.

Comparative Example 2-1

A secondary battery was prepared under the same conditions as in Example 1-2 except that lithium was not inserted into the silicon compound particles. The cycle characteristics and first time efficiency were evaluated.

Table 2 shows the results of Examples 2-1, 2-2 and Comparative Example 2-1.

TABLE 2

SiOx: x = 1, $D_{50}$ = 6 μm; graphite (natural graphite:artificial graphite = 5:5): $D_{50}$ = 20 μm;
SiOx ratio 10 mass %; carbon material: average thickness 100 nm; half value width 1.755°, crystallite 4.86 nm; modification method: thermal doping; A > B; metal compound particles: alumina particles, zirconia particles, yttria particles, primary particle size 0.7 μm, secondary particle size 2 μm;
Al(Kα)/Si(Kα) = 0.007, Zr-Kα peak: present, Zr-Kβ peak: present, Y-Kα peak: present, Y-Kβ peak: absent

| Table 2 | lithium silicate | Capacity retention rate (%) | Initial efficiency (%) |
|---|---|---|---|
| Example 2-1 | $Li_2SiO_3$ | 80.7 | 87.6 |
| Example 2-2 | $Li_4SiO_4$ | 80.8 | 87.4 |

TABLE 2-continued

SiOx: x = 1, $D_{50}$ = 6 µm; graphite (natural
graphite:artificial graphite = 5:5): $D_{50}$ = 20 µm;
SiOx ratio 10 mass %; carbon material: average thickness
100 nm; half value width 1.755°, crystallite 4.86 nm;
modification method: thermal doping; A > B;
metal compound particles: alumina particles, zirconia
particles, yttria particles, primary particle size 0.7 µm,
secondary particle size 2 µm;
Al(Kα)/Si(Kα) = 0.007, Zr-Kα peak: present, Zr-Kβ peak:
present, Y-Kα peak: present, Y-Kβ peak: absent

| Table 2 | lithium silicate | Capacity retention rate (%) | Initial efficiency (%) |
|---|---|---|---|
| Example 1-2 | $Li_2SiO_3$, $Li_4SiO_4$ | 81.3 | 88.2 |
| Comparative Example 2-1 | — | 77.0 | 82.5 |

When the silicon compound contained stable lithium silicate such as $Li_2SiO_3$ and $Li_4SiO_4$, the capacity retention rate and initial efficiency were improved. Particularly, when both lithium silicates $Li_2SiO_3$ and $Li_4SiO_4$ were incorporated, the capacity retention rate and initial efficiency were further improved. On the other hand, in Comparative Example 2-1 in which the silicon compound was not modified and did not contain lithium, the capacity retention rate and initial efficiency were decreased.

Examples 3-1 to 3-9

Secondary batteries were prepared under the same conditions as in Example 1-2 except that the metal compound particles in the negative electrode material were replaced with metal compound particles as shown in Table 3. The cycle characteristics and first time efficiencies were evaluated. The mass ratio, average primary particle size, and average secondary particle size of the metal compound particles in each negative electrode material were the same as those in Example 1-2, and only the kind of the metal compounds in the metal compound particles and the mixed ratio of the particles were changed.

Further, in each of Examples 3-1 to 3-9 and Comparative Example 3-1 to be described later, the slurry stability and the secondary battery safety were also evaluated.

The slurry stability was evaluated based on the time till a gas was generated from the slurry. It can be said that the longer the time, the more stable the slurry is. Specifically, 30 g of a portion of the prepared negative-electrode mixture slurry was take out separately from the rest for producing a secondary battery, and stored at 20° C. to measure the time till a gas was generated after the negative-electrode mixture slurry was prepared.

The secondary battery safety was evaluated by a nail penetration test. Specifically, in each Example, ten secondary batteries charged to 4.2 V were prepared and penetrated with a nail 2.7 mm in diameter at a rate of 5 mm/s. At the time of penetration, the number of secondary batteries was counted which satisfied the safety acceptance criterion in the nail penetration test.

These measurements were also performed in Example 1-2.

Comparative Example 3-1

A secondary battery was prepared under the same conditions as in Example 1-2 except that no metal compound particle was added to the negative electrode material. The cycle characteristics, first time efficiency, slurry stability, and secondary battery safety were evaluated.

Table 3 shows the results of Examples 3-1 to 3-9 and Comparative Example 3-1.

TABLE 3

SiOx: x = 1, $D_{50}$=6 µm; graphite (natural
graphite:artificial graphite = 5:5): $D_{50}$=20 µm;
SiOx ratio 10 mass %; $Li_2SiO_3$, $Li_4SiO_4$; carbon material:
average thickness 100 nm; half value width 1.755°,
crystallite 4.86 nm; modification method: thermal doping; A > B;
metal compound particle: primary particle size 0.7 µm,
secondary particle size 2 µm,

| Table 3 | Kind of metal compound particle | Capacity retention rate (%) | Initial efficiency (%) | Time till gas generation (hours) | Number of batteries passed nail penetration test |
|---|---|---|---|---|---|
| Example 3-1 | alumina particles | 80.1 | 87.5 | 60 | 5 |
| Example 3-2 | zirconia particles | 80.0 | 87.6 | 36 | 5 |
| Example 3-3 | yttria particles | 80.1 | 87.4 | 20 | 5 |
| Example 3-4 | alumina particles, zirconia particles | 80.7 | 87.8 | 60 | 6 |
| Example 3-5 | zirconia particles, yttria particles | 80.9 | 87.6 | 48 | 6 |
| Example 3-6 | yttria particles, alumina particles | 80.8 | 87.9 | 56 | 6 |
| Example 1-2 | alumina particles, zirconia particles, yttria particles | 81.3 | 88.2 | 72 | 10 |
| Example 3-7 | aluminum phosphate particles, zirconium phosphate particles, yttrium phosphate particles | 81.4 | 88.3 | 70 | 10 |
| Example 3-8 | aluminum silicate particles, zirconium silicate particles, yttrium silicate particles | 81.0 | 88.1 | 72 | 10 |
| Example 3-9 | aluminum phosphate particles, alumina particles, yttria particles | 81.3 | 88.3 | 72 | 10 |
| Comparative Example 3-1 | None | 75.2 | 87.3 | 6 | 3 |

As can be seen from Table 3, in all Examples in which the metal compound particles were added to the negative electrode material, the slurry stability was improved, and both of the initial efficiency and capacity retention rate were improved in comparison with Comparative Example 3-1. Particularly, the capacity retention rate was greatly improved. Moreover, the number of secondary batteries passed the nail penetration test was also increased, and the secondary battery safety was improved, too.

Further, as can be seen from Examples 3-1 to 3-6, it was found that the effects of improving the slurry stability, initial efficiency, and capacity retention rate were sufficiently obtained by incorporating at least one kind of alumina particles, zirconia particles, and yttria particles. Furthermore, it was found as shown from Examples 3-7, 3-8, 3-9 that the metal compound was not limited to only oxides, and that even when phosphates and silicates were used, the effects of improving the slurry stability, initial efficiency, and capacity retention rate were sufficiently obtained.

On the other hand, in Comparative Example 3-1 in which no metal compound particle was added to the negative electrode material, the slurry stability was decreased, and both of the initial efficiency and capacity retention rate were lowered. Particularly, the capacity retention rate was greatly lowered. Moreover, as the slurry stability was decreased, the number of secondary batteries passed the nail penetration test was also small.

Examples 4-1 to 4-10

Secondary batteries were prepared under the same conditions as in Example 1-2 except that the average primary particle size of the metal compound particles and the average secondary particle size of the aggregate were changed as shown in Table 4. The cycle characteristics, first time efficiency, slurry stability, and secondary battery safety were evaluated. Note that, in Example 4-10, the metal particles hardly aggregated, and the average primary particle size had the same value as the average secondary particle size.

As shown in Table 4, in Examples 4-3, 4-5, 4-6, 4-7, 4-10, 1-2 in which the metal compound particles had an average primary particle size of 0.1 μm or more and 4 μm or less, the time till gas generation was longer and the slurry stability was further improved than Examples 4-1, 4-2, 4-4 in which the average primary particle size exceeded 4 μm and Examples 4-8, 4-9 in which the average primary particle size was below 0.1 μm. This is presumably because when the average primary particle size is 0.1 μm or more and 4 μm or less, the metal compound particles have a BET specific surface area of an appropriate value, and sufficiently react with lithium eluted into the slurry. Moreover, in Examples 4-4, 4-5, 4-6, 4-8, 1-2 in which the aggregate of the metal compound particles had an average secondary particle size of 0.1 μm or more and 20 μm or less, the number of secondary batteries passed the nail penetration test was increased in comparison with Examples 4-1 to 4-3, 4-9 which did not satisfied the range of the secondary particle size. This is because when the aggregate of the metal compound particles has an average secondary particle size of 0.1 μm or more and 20 μm or less, the portion where the negative electrode active material particles exist in a low proportion is rarely formed in the negative electrode material, successfully suppressing Li precipitation particularly during charging.

Examples 5-1 to 5-4

Secondary batteries were prepared under the same conditions as in Example 1-2 except for changing the peak intensity ratio Al(Kα)/Si(Kα) as shown in Table 5. The cycle characteristics, first time efficiency, and slurry stability were evaluated. Al(Kα)/Si(Kα) was adjusted by changing the amount of alumina particles mixed.

TABLE 4

SiOx: x = 1, $D_{50}$ = 6 μm; graphite (natural graphite:artificial graphite = 5:5): $D_{50\_}$ 20 μm; SiOx ratio 10 mass %; carbon material: average thickness 100 nm; half value width 1.755°, crystallite 4.86 nm; modification method: thermal doping; A > B; metal compound particles: alumina particles, zirconia particles, yttria particles

| Table 4 | Average primary particle size (μm) | Average secondary particle size (μm) | Capacity retention rate (%) | Initial efficiency (%) | Time till gas generation (hours) | Number of batteries passed nail penetration test |
|---|---|---|---|---|---|---|
| Example 4-1 | 8 | 25 | 80.2 | 87.9 | 20 | 6 |
| Example 4-2 | 5 | 22 | 80.0 | 87.6 | 20 | 6 |
| Example 4-3 | 4 | 21 | 80.1 | 87.4 | 60 | 6 |
| Example 4-4 | 5 | 19 | 80.7 | 87.8 | 32 | 7 |
| Example 4-5 | 4 | 20 | 80.9 | 87.6 | 60 | 10 |
| Example 4-6 | 2 | 9 | 80.8 | 87.9 | 60 | 10 |
| Example 1-2 | 0.7 | 2 | 81.3 | 88.2 | 72 | 10 |
| Example 4-7 | 0.1 | 0.3 | 81.2 | 87.7 | 60 | 10 |
| Example 4-8 | 0.08 | 0.1 | 80.3 | 87.9 | 48 | 8 |
| Example 4-9 | 0.03 | 0.09 | 80.0 | 87.6 | 20 | 6 |
| Example 4-10 | 2 | 2 | 81.1 | 88.4 | 72 | 10 |

TABLE 5

SiOx: x = 1, $D_{50}$_6 μm; graphite (natural
graphite:artificial graphite = 5:5): $D_{50}$_20 μm;
SiOx ratio 10 mass %; $Li_2SiO_3$, $Li_4SiO_4$; carbon material:
average thickness 100 nm; half value width 1.755°,
crystallite 4.86 nm; modification method: thermal doping; A > B;
metal compound particles: alumina particles, zirconia
particles, yttria particles, primary particle size 0.7 μm,
secondary particle size 2 μm;
Zr-Kα peak: present, Zr-Kβ peak: present, Y-Kα peak:
present, Y-Kβ peak: absent

| Table 5 | Al(Kα)/Si(Kα) | Capacity retention rate (%) | Initial efficiency (%) | Time till gas generation (hours) |
|---|---|---|---|---|
| Example 5-1 | 0.001 | 81.1 | 88.0 | 60 |
| Example 5-2 | 0.002 | 81.1 | 88.1 | 70 |
| Example 1-2 | 0.007 | 81.3 | 88.2 | 72 |
| Example 5-3 | 0.01 | 81.3 | 88.2 | 72 |
| Example 5-4 | 0.012 | 80.6 | 88.1 | 72 |

As can be seen from Table 5, in Examples 5-1 to 5-3, 1-2 in which the peak intensity ratio Al(Kα)/Si(Kα) was 0.002 or more and 0.01 or less, the slurry stability was further improved in comparison with Example 5-1 in which the ratio was less than 0.002; moreover, an increase in resistance was successfully suppressed in comparison with Example 5-4 in which the ratio was more than 0.01. Therefore, the capacity retention rate was improved.

Example 6-1

A secondary battery was prepared under the same conditions as in Example 1-2 except that a negative electrode material was used which did not exhibit both of peaks indicating zirconium Kα and Kβ lines. The cycle characteristics, first time efficiency, and slurry stability were evaluated. Such a negative electrode material was obtained by decreasing the ratio of zirconia particles in the metal compound particles.

TABLE 6

SiOx: x = 1, $D_{50}$_6 μm; graphite (natural
graphite:artificial graphite = 5:5): $D_{50}$_20 μm;
SiOx ratio 10 mass %; $Li_2SiO_3$, $Li_4SiO_4$; carbon material:
average thickness 100 nm; half value width 1.755°,
crystallite 4.86 nm; modification method: thermal
doping; A > B;
metal compound particles: alumina particles, zirconia
particles, yttria particles, primary particle size 0.7 μm,
secondary particle size 2 μm;
Al(Kα)/Si(Kα) = 0.007, Y-Kα peak: present, Y-Kβ peak:
absent

| Table 6 | Presence or absence of Zr-Kα peak | Presence or absence of Zr-Kβ peak | Capacity retention rate (%) | Initial efficiency (%) | Time till gas generation (hours) |
|---|---|---|---|---|---|
| Example 1-2 | present | present | 81.3 | 88.2 | 72 |
| Example 6-1 | absent | absent | 79.1 | 86.9 | 20 |

As shown in Table 6, it was found that when peaks indicating zirconium Kα and Kβ lines were exhibited, the effects of improving the slurry stability, initial efficiency, and capacity retention rate were more sufficiently obtained.

Example 7-1

A secondary battery was prepared under the same conditions as in Example 1-2 except that a negative electrode material was used which did not exhibit both of peaks indicating yttrium Kα and Kβ lines. The cycle characteristics, first time efficiency, slurry stability, and battery safety were evaluated. Such a negative electrode material was obtained by decreasing the ratio of yttria particles in the metal compound particles.

Example 7-2

A secondary battery was prepared under the same conditions as in Example 1-2 except that a negative electrode material was used which exhibited both of peaks indicating yttrium Kα and Kβ lines. The cycle characteristics, first time efficiency, slurry stability, and battery safety were evaluated. Such a negative electrode material was obtained by increasing the ratio of yttria particles in the metal compound particles.

TABLE 7

SiOx: x = 1, $D_{50}$_ 6 μm; graphite (natural graphite:artificial
graphite = 5:5): $D_{50}$_ 20 μm; SiOx ratio 10 mass %; $Li_2SiO_3$,
$Li_4SiO_4$; carbon material: average thickness 100 nm; half value width 1.755°,
crystallite 4.86 nm; modification method: thermal doping; A > B; metal compound
particles: alumina particles, zirconia particles, yttria particles, primary particle
size 0.7 μm, secondary particle size 2 μm; Al(Kα)/Si(Kα) = 0.007,
Zr-Kα peak: present, Zr-Kβ peak: present

| Table 7 | Presence or absence of Y-Kα peak | Presence or absence of Y-Kβ peak | Capacity retention rate (%) | Initial efficiency (%) | Time till gas generation (hours) | Number of batteries passed nail penetration test |
|---|---|---|---|---|---|---|
| Example 1-2 | present | absent | 81.3 | 88.2 | 72 | 10 |
| Example 7-1 | Absent | absent | 79.1 | 86.9 | 60 | 6 |
| Example 7-2 | present | present | 80.3 | 87.8 | 72 | 10 |

As shown in Table 7, in Example 1-2 which exhibited a peak indicating a yttrium Kα line but no peak indicating the Kβ line, since the yttrium amount was appropriate, better performances were demonstrated in comparison with Examples 7-1, 7-2.

Examples 8-1 to 8-6

Secondary batteries were prepared under the same conditions as in Example 1-2 except for changing the crystallinity of silicon compound particles as shown in Table 8. The cycle characteristics, first time efficiency, stability of aqueous negative electrode slurry, and secondary battery safety were evaluated. Note that the crystallinity in silicon compound particles can be controlled by changing the evaporation temperature of the raw material or a heat treatment after the silicon compound particle preparation.

TABLE 8

SiOx: x = 1, $D_{50}$ 6 μm; graphite (natural graphite:artificial graphite = 5:5): $D_{50}$ 20 μm; SiOx ratio 10 mass %; $Li_2SiO_3$, $Li_4SiO_4$; carbon material: average thickness 100 nm; modification method: thermal doping; A > B; metal compound particles: alumina particles, zirconia particles, yttria particles, primary particle size 0.7 μm, secondary particle size 2 μm; Al(Kα)/Si(Kα) = 0.007, Zr-Kα peak: present, Zr-Kβ peak: present, Y-Kα peak: present, Y-Kβ peak: absent

| Table 8 | Half value width (°) | Si(111) crystallite size (nm) | Capacity retention rate (%) | Initial efficiency (%) | Time till gas generation (hours) | Number of batteries passed nail penetration test |
|---|---|---|---|---|---|---|
| Example 8-1 | 0.756 | 11.42 | 80.4 | 88.5 | 72 | 10 |
| Example 8-2 | 0.796 | 10.84 | 80.5 | 88.5 | 72 | 10 |
| Example 8-3 | 1.025 | 8.55 | 80.7 | 88.4 | 72 | 10 |
| Example 8-4 | 1.218 | 7.21 | 81.1 | 88.3 | 72 | 10 |
| Example 8-5 | 1.271 | 6.63 | 81.1 | 88.3 | 72 | 10 |
| Example 1-2 | 1.755 | 4.86 | 81.3 | 88.2 | 72 | 10 |
| Example 8-6 | 2.593 | 3.29 | 81.5 | 88.0 | 72 | 10 |

Particularly when the half value width was 1.2° or more and the size of the crystallite corresponding to the Si(111) plane was 7.5 nm or less, an especially high capacity retention rate was obtained from the low-crystallinity material.

Example 9-1

A secondary battery was prepared under the same conditions as in Example 1-2 except that the silicon compound satisfied a relationship of A<B where A is the maximum peak intensity value in the Si and Li silicate regions, and B is the peak intensity value derived from the $SiO_2$ region. The cycle characteristics, first time efficiency, stability of aqueous negative electrode slurry, and secondary battery safety were evaluated. In this case, the amount of lithium inserted was reduced in the modification to reduce the $Li_2SiO_3$ amount, so that the peak intensity A derived from $Li_2SiO_3$ was lowered.

TABLE 9

SiOx: x = 1, $D_{50}$=6 μm; graphite (natural graphite:artificial graphite = 5:5): $D_{50}$=20 μm; SiOx ratio 10 mass %; $Li_2SiO_3$, $Li_4SiO_4$; carbon material: average thickness 100 nm; half value width 1.755°, crystallite 4.86 nm; modification method: thermal doping, metal compound particles: alumina particles, zirconia particles, yttria particles, primary particle size 0.7 μm, secondary particle size 2 μm; Al(Kα)/Si(Kα) = 0.007, Zr-Kα peak: present, Zr-Kβ peak: present, Y-Kα peak: present, Y-Kβ peak: absent

| Table 9 | A.B | Capacity retention rate (%) | Initial efficiency (%) | Time till gas generation (hours) | Number of batteries passed nail penetration test |
|---|---|---|---|---|---|
| Example 9-1 | A < B | 80.9 | 87.6 | 72 | 10 |
| Example 1-2 | A > B | 81.3 | 88.2 | 72 | 10 |

As can be seen from Table 9, when the peak intensity relationship was A>B, the battery properties were improved.

Examples 10-1 to 10-6

Secondary batteries were prepared under the same conditions as in Example 1-2 except that the median diameter of silicon compound particles was changed as shown in Table 10. The cycle characteristics, first time efficiency, stability of aqueous negative electrode slurry, and secondary battery safety were evaluated.

TABLE 10

SiOx: x = 1; graphite (natural graphite:artificial graphite = 5:5): $D_{50}$_20 μm;
SiOx ratio 10 mass %; $Li_2SiO_3$, $Li_4SiO_4$; carbon material: average thickness 100 nm; half value width 1.755°, crystallite 4.86 nm; modification method: thermal doping; A > B;
metal compound particles: alumina particles, zirconia particles, yttria particles, primary particle size 0.7 μm, secondary particle size 2 μm;
Al(Kα)/Si(Kα) = 0.007, Zr-Kα peak: present, Zr-Kβ peak: present, Y-Kα peak: present, Y-Kβ peak: absent

| Table 10 | Median diameter (μm) | Capacity retention rate (%) | Initial efficiency (%) | Time till gas generation (hours) | Number of batteries passed nail penetration test |
|---|---|---|---|---|---|
| Example 10-1 | 0.5 | 79.7 | 87.4 | 72 | 10 |
| Example 10-2 | 1 | 81.0 | 87.8 | 72 | 10 |
| Example 10-3 | 3 | 81.2 | 88.0 | 72 | 10 |
| Example 1-2 | 6 | 81.3 | 88.2 | 72 | 10 |
| Example 10-4 | 10 | 81.5 | 88.3 | 72 | 10 |
| Example 10-5 | 15 | 81.8 | 88.5 | 72 | 10 |
| Example 10-6 | 20 | 80.8 | 87.5 | 72 | 10 |

When the median diameter of the negative electrode active material particles was 1.0 μm or more, the retention rate and initial efficiency were further improved. This is presumably because the surface area per mass of the negative electrode active material particles was not so large that the area where a side reaction occurred was small. Further, when the median diameter of the negative electrode active material particles is 15 μm or less, the particles are hard to break upon charging, so that SEI (solid electrolyte interface) due to the new surface is hardly formed upon charging and discharging. Thus, the reversible Li loss is successfully suppressed. In addition, when the median diameter is 15 μm or less, expansion amount of the silicon compound particles upon charging is not so large, making it possible to prevent physical and electrical destruction of the negative electrode active material layer due to expansion.

Examples 11-1 to 11-4

Secondary batteries were prepared under the same conditions as in Example 1-2 except that the average thickness of the carbon material which covered the surface of the silicon-based active material particle was changed as shown in Table 11. The cycle characteristics, first time efficiency, stability of aqueous negative electrode slurry, and secondary battery safety were evaluated. The average thickness of the carbon material can be adjusted by changing the CVD conditions.

Example 11-5

A secondary battery was prepared under the same conditions as in Example 1-2 except that the surface of the silicon-based active material particle was not coated with a carbon material. The cycle characteristics, first time efficiency, stability of aqueous negative electrode slurry, and secondary battery safety were evaluated.

TABLE 11

SiOx: x = 1, $D_{50}$_6 μm; graphite (natural graphite:artificial graphite = 5:5): $D_{50}$_20 μm;
SiOx ratio 10 mass %; $Li_2SiO_3$, $Li_4SiO_4$;
half value width 1.755°, crystallite 4.86 nm;
modification method: thermal doping; A > B;
metal compound particles: alumina particles, zirconia particles, yttria particles, primary particle size 0.7 μm, secondary particle size 2 μm;
Al(Kα)/Si(Kα) = 0.007, Zr-Kα peak: present, Zr-Kβ peak: present, Y-Kα peak: present, Y-Kβ peak: absent

| Table 11 | Average thickness (nm) | Capacity retention rate (%) | Initial efficiency (%) | Time till gas generation (hours) | Number of batteries passed nail penetration test |
|---|---|---|---|---|---|
| Example 11-1 | 5 | 80.8 | 87.9 | 72 | 10 |
| Example 11-2 | 10 | 81.0 | 88.0 | 72 | 10 |
| Example 1-2 | 100 | 81.3 | 88.2 | 72 | 10 |
| Example 11-3 | 1000 | 81.6 | 88.5 | 72 | 10 |
| Example 11-4 | 5000 | 81.7 | 88.8 | 72 | 10 |
| Example 11-5 | 0 | 78.7 | 87.3 | 72 | 10 |

As can be seen from Table 11, coating with the carbon material increased the capacity retention rate and initial efficiency. In addition, particularly when the carbon material layer had a thickness of 10 nm or more, the electric conductivity was further improved, making it possible to further improve the capacity retention rate and initial efficiency. Meanwhile, when the carbon layer had a thickness of 5000 nm or less, the amount of silicon compound particles was sufficiently secured in battery design, and did not decrease the battery capacity thereby.

Example 12-1

A secondary battery was prepared under the same conditions as in Example 1-2 except that the method for modifying the silicon compound particles was changed to the oxidation-reduction method. The cycle characteristics, first time efficiency, stability of aqueous negative electrode slurry, and secondary battery safety were evaluated.

The modification by the oxidation-reduction method was performed as follows. First, the silicon compound particles (negative electrode active material particles) coated with the carbon material was immersed in a solution (solution A) in which a lithium piece and an aromatic compound, naphthalene, were dissolved in tetrahydrofuran (hereinafter, referred to as THF). This solution A had been prepared by dissolving naphthalene in the THF solvent at a concentration of 0.2 mol/L, and then adding a lithium piece whose mass was 10 mass % of the mixture solution of THF and naphthalene. Meanwhile, when the negative electrode active material particles were immersed, the temperature of the solution was 20° C., and the immersing time was 20 hours. Then, the negative electrode active material particles were collected by filtration. By the treatment described above, lithium was inserted into the negative electrode active material particle.

Subsequently, the obtained silicon compound particles were heated under an argon atmosphere at 600° C. for 24 hours. Thus, the Li compound was stabilized.

Next, the negative electrode active material particles were washed. The washed negative electrode active material particles were dried under reduced pressure. Thus, the silicon compound particles were modified.

TABLE 12

SiOx: x = 1, $D_{50}$=6 µm; graphite (natural graphite:artificial graphite = 5:5): $D_{50}$=20 µm; SiOx ratio 10 mass %; $Li_2SiO_3$, $Li_4SiO_4$; carbon material: average thickness 100 nm; A > B; metal compound particles: alumina particles, zirconia particles, yttria particles, primary particle size 0.7 µm, secondary particle size 2 µm; Al(Kα)/Si(Kα) = 0.007, Zr-Kα peak: present, Zr-Kβ peak: present, Y-Kα peak: present, Y-Kβ peak: absent

| Table 12 | Modification method | Capacity retention rate (%) | Initial efficiency (%) | Time till gas generation (hours) | Number of batteries passed nail penetration test |
|---|---|---|---|---|---|
| Example 1-2 | thermal doping method | 81.3 | 88.2 | 72 | 10 |
| Example 12-1 | oxidation-reduction method | 81.5 | 88.4 | 72 | 10 |

As shown in Table 12, even when the method for modifying the silicon compound particles was changed, favorable cycle characteristics, first time efficiency, stability of aqueous negative electrode slurry, and secondary battery safety were obtained.

Example 13-1

Secondary batteries were prepared under the same conditions as in Example 1-2 except for changing the mass ratio of the silicon-based active material particles in the negative electrode active material. The increasing rate of the battery capacity was evaluated.

FIG. 8 is a graph showing relationships between the ratio of the silicon-based active material particles relative to the total amount of the negative electrode active material and the increasing rate of the battery capacity of the secondary battery. The graph indicated by A in FIG. 8 shows the increasing rate of the battery capacity when the ratio of the silicon compound particles was increased in the inventive negative electrode active material for the negative electrode. Meanwhile, the graph indicated by B in FIG. 8 shows the increasing rate of the battery capacity when the ratio of silicon compound particles not doped with Li was increased. As can be seen from FIG. 8, when the ratio of the silicon compound was 6 mass % or more, the increasing rate of the battery capacity was higher than that in the conventional case, so that the volume energy density was particularly remarkably increased.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A negative electrode material comprising a negative electrode active material particle;
   the negative electrode active material particle comprising a silicon compound particle containing a silicon compound: $SiO_x$, where $0.5 \leq x \leq 1.6$,
   wherein the silicon compound particle contains at least one or more of $Li_2SiO_3$ and $Li_4SiO_4$,
   the negative electrode material further comprises at least one of a) a metal compound particle and b) an aggregate of the metal compound particle,
   the metal compound particle contains at least one selected from the group consisting of an oxide, a phosphate and a silicate of at least one selected from the group consisting of aluminum, zirconium, and yttrium,
   the metal compound particle has an average primary particle size of 0.1 µm or more and 4 µm or less,
   the aggregate of the metal compound particle has an average secondary particle size of 0.1 µm or more and 20 µm or less, and
   the negative electrode material is produced by mixing the at least one of a) the metal compound particle and b) the aggregate of the metal compound particle with the negative electrode active material particle containing the silicon compound particle.

2. The negative electrode material according to claim 1, wherein the metal compound particle has a bond between a metal element and oxygen.

3. The negative electrode material according to claim 1, wherein
   an X-ray fluorescence spectrum obtained from X-ray fluorescence analysis of the negative electrode material has a peak indicating an aluminum Kα line around 1.49 keV and a peak indicating a silicon Kα line around 1.74 keV, and
   a ratio Al(Kα)/Si(Kα) of an intensity of the peak indicating the aluminum Kα line to an intensity of the peak indicating the silicon Kα line is 0.002 or more and 0.01 or less.

4. The negative electrode material according to claim 1, wherein an X-ray fluorescence spectrum obtained from X-ray fluorescence analysis of the negative electrode material has a peak indicating a zirconium Kα line around 15.74 keV and a peak indicating a zirconium Kβ line around 17.66 keV.

5. The negative electrode material according to claim 1, wherein an X-ray fluorescence spectrum obtained from X-ray fluorescence analysis of the negative electrode material has a peak indicating a yttrium Kα line around 14.93 keV but no peak indicating a yttrium Kβ line around 16.73 keV.

6. The negative electrode material according to claim 1, wherein
   the silicon compound particle has a diffraction peak attributable to a Si(111) crystal face obtained from an X-ray diffraction using a Cu-Kα line,
   a half value width (2θ) of the diffraction peak is 1.2° or more, and a crystallite size corresponding to the crystal face is 7.5 nm or less.

7. The negative electrode material according to claim 1, wherein the silicon compound particle satisfies a relationship of A>B where A is a maximum peak intensity value in Si and Li silicate regions given as a chemical shift value of −60 to −95 ppm, and B is a peak intensity value in a $SiO_2$ region given as a chemical shift value of −96 to −150 ppm, the values being obtained from a $^{29}Si$-MAS-NMR spectrum of the silicon compound particle.

8. The negative electrode material according to claim 1, wherein the negative electrode active material particle has a median diameter of 1.0 μm or more and 15 μm or less.

9. The negative electrode material according to claim 1, wherein the negative electrode active material particle has a surface layer portion containing a carbon material.

10. The negative electrode material according to claim 9, wherein an average thickness of the carbon material is 10 nm or more and 5000 nm or less.

11. A mixed negative electrode material comprising:
the negative electrode material according to claim 1; and
a carbon-based active material.

12. A method of producing the negative electrode material of claim 1, comprising the steps of:
preparing a silicon compound particle containing a silicon compound: $SiO_x$, where 0.5≤x≤1.6;
inserting Li into the silicon compound particle so as to include at least one or more of $Li_2SiO_3$ and $Li_4SiO_4$ to prepare a negative electrode active material particle; and
mixing the negative electrode active material particle with at least one of a) a metal compound particle and b) an aggregate of the metal compound particle to produce a negative electrode material;
wherein the metal compound particle contains at least one selected from the group consisting of an oxide, a phosphate and a silicate of at least one selected from the group consisting of aluminum, zirconium, and yttrium the metal compound particle has an average primary particle size of 0.1 μm or more and 4 μm or less, and the aggregate of the metal compound particle has an average secondary particle size of 0.1 μm or more and 20 μm or less.

13. The negative electrode material according to claim 1, wherein the mixing to produce the negative electrode material comprising the negative electrode active material particle is a dry mixing method selected from the group consisting of stirring, rolling, and shearing.

14. The negative electrode material according to claim 1, wherein the mixing to produce the negative electrode material comprising the negative electrode active material particle is a wet mixing method in which the metal compound particle is dispersed in a solution that is sprayed onto the negative electrode active material particle.

15. The negative electrode material according to claim 9, wherein the carbon material in the surface layer portion contains lithium.

16. The negative electrode material according to claim 1, wherein a surface layer of the silicon compound particle does not contain a carbon material.

17. The negative electrode material according to claim 1, wherein i) the negative electrode active material particle and ii) the at least one of a) the metal compound particle and b) the aggregate of the metal compound particle are present in a mixed state in the negative electrode material.

* * * * *